United States Patent [19]
Wlaschin et al.

[11] Patent Number: 5,893,087
[45] Date of Patent: *Apr. 6, 1999

[54] METHOD AND APPARATUS FOR IMPROVED INFORMATION STORAGE AND RETRIEVAL SYSTEM

[75] Inventors: Scott Wlaschin; Robert Gordon, both of Los Angeles; Louise J. Wannier, La Canada, all of Calif.; Clay Gordon, New York, N.Y.

[73] Assignee: Dex Information Systems, Inc., Pasadena, Calif.

[ * ] Notice: The term of this patent shall not extend beyond the expiration date of Pat. No. 5,729,730.

[21] Appl. No.: 633,842

[22] Filed: Apr. 10, 1996

Related U.S. Application Data

[63] Continuation-in-part of Ser. No. 383,752, Mar. 28, 1995, Pat. No. 5,729,730.

[51] Int. Cl.[6] .................................................. G06F 17/30
[52] U.S. Cl. ..................... 707/3; 707/1; 707/4; 707/102
[58] Field of Search ................................. 707/1, 3, 4, 102

[56] References Cited

U.S. PATENT DOCUMENTS

| | | | |
|---|---|---|---|
| 5,295,256 | 3/1994 | Bapat | 395/500 |
| 5,305,389 | 4/1994 | Palmer | 382/1 |
| 5,359,724 | 10/1994 | Earle | 395/425 |
| 5,375,237 | 12/1994 | Tanaka et al. | 395/650 |
| 5,421,012 | 5/1995 | Khoyi et al. | 395/650 |
| 5,459,860 | 10/1995 | Burnett et al. | 707/1 |
| 5,499,180 | 3/1996 | Ammirato et al. | 364/419.1 |
| 5,537,591 | 7/1996 | Oka | 707/4 |
| 5,537,633 | 7/1996 | Suzuki et al. | 707/3 |
| 5,553,218 | 9/1996 | Li et al. | 395/148 |
| 5,557,787 | 9/1996 | Shin et al. | 707/1 |
| 5,560,005 | 9/1996 | Hoover et al. | 707/3 |
| 5,564,046 | 10/1996 | Nemoto et al. | 707/4 |
| 5,729,730 | 3/1998 | Wlaschin et al. | 707/3 |

*Primary Examiner*—Thomas G. Black
*Assistant Examiner*—Frantz Coby
*Attorney, Agent, or Firm*—Irell & Manella LLP

[57] ABSTRACT

The information management and database system of the present invention comprises a flexible, self-referential table that stores data. The table of the present invention may store any type of data, both structured and unstructured, and provides an interface to other application programs. The table of the present invention comprises a plurality of rows and columns. Each row has an object identification number (OID) and each column also has an OID. A row corresponds to a record and a column corresponds to a field such that the intersection of a row and a column comprises a cell that may contain data for a particular record related to a particular field, a cell may also point to another record. To enhance searching and to provide for synchronization between columns, columns are entered as rows in the table and the record corresponding to a column contains various information about the column. The table includes an index structure for extended queries.

81 Claims, 20 Drawing Sheets

Microfiche Appendix Included
(1 Microfiche, 57 Pages)

| OBJECT ID | TYPE [#101] | [#1012] LABEL | ADDRESS [#1013] | EMPLOYED BY [#1019] | TITLE [#1033] | AUTHOR [#1032] |
|---|---|---|---|---|---|---|
| #1100 | #1020 [COMPANY] | DEXIS | 117 EAST COLORADO | 134 | N/A | N/A |
| #1101 | #1010 [PERSON] | SCOTT WLASCHIN | | #1100 [DEXIS] | N/A | N/A |
| #1118 | #1030 [BOOK] | | | | | #1122 |
| #1122 | #1050 [MEMO] | | | | | #1122 |
| #1127 | #1060 [DOCUMENT] | | C:\WORD\PROJ.DOC | | PROJECT PLAN | #1101 |
| #1019 | #210 [FIELD] | EMPLOYED BY | | | | |
| #210 | #111 [TYPE] | COLUMN | | | | |
| #111 | #111 [TYPE] | TYPE | | | | |

FIG. 3

| OBJECT ID | TYPE [#101] | [#1012] LABEL | ADDRESS [#1013] | EMPLOYED BY [#1019] | TITLE [#1033] | AUTHOR [#1032] |
|---|---|---|---|---|---|---|
| #1100 | #1020 [COMPANY] | DEXIS | 117 EAST COLORADO | | N/A | N/A |
| #1101 | #1010 [PERSON] | SCOTT WLASCHIN | | #1100 [DEXIS] | N/A | N/A |
| #1118 | #1030 [BOOK] | | | | | #1122 |
| #1122 | #1050 [MEMO] | | | | | #1122 |
| #1127 | #1060 [DOCUMENT] | | C:\WORD\ PROJ.DOC | | PROJECT PLAN | #1101 |
| #1019 | #210 [FIELD] | EMPLOYED BY | | | | |
| #210 | #111 [TYPE] | COLUMN | | | | |
| #111 | #111 [TYPE] | TYPE | | | | |

FIG. 8a

| FIRST NAME | LAST NAME | NAME |
|---|---|---|
| JOHN | SMITH | THE NAME IS FIELD REF FIELD= FIRST NAME X FIELD REF FIELD = 'LAST NAME' |

FIG. 8b

| FIRST NAME | LAST NAME | NAME |
|---|---|---|
| JOHN | SMITH | fn = FIELD A+ (SELF, FIRST NAME)<br>ln. = FIELD A+ (SELF, LAST NAME)<br>RETURN ("THE NAME IS" + fn + ln) |

FIG. 9

| OID | #80 #101 [TYPE] | #2 [LABEL] | #1013 [ADDRESS] | #1019 [EMPLOYED BY] | #801 [RECORD CONTENTS] |
|---|---|---|---|---|---|
| | COLUMN | RECORD CONTENTS | | | |
| #1100 | COMPANY | DEXIS | 117 E COLORADO | NA | 2 [LABEL]; 101 TYPE; 301 [PARENT FOLDER]; 1022 [COMPANY]; 1023 [TYPE OF BUSINESS]; 1013 [ADDRESS]; 1014 [CITY]; 1015 [STATE]; 1017 [PHONE]; 4 [COMMENT]. |
| #1101 | PERSON | SCOTT WLASCHIN | 777 N CHESTER | #1100 | 2 [LABEL]; 101 TYPE; 301 [PARENT FOLDER]; 1012 [NAME]; 1013 [ADDRESS]; 1014 [CITY]; 1015 [STATE]; 4 [COMMENT]; 1019 [EMPLOYED BY] |
| #1118 | BOOK | 1984 | NA | NA | 2 [LABEL]; 101 TYPES 301 [PARENT FOLDER]; 1033 [TITLE]; 1032 [AUTHOR]; 4 [COMMENT] |

DEFINITION FOR RECORD CONTENTS COLUMN — 100

RECORD CONTENTS COLUMN IN USE

FIG. 10

| OBJECTID | #101 [TYPE] | #2 [LABEL] | #301 [PARENT FOLDER] | #320 [FOLDER CHILDREN] |
|---|---|---|---|---|
| #301 | FIELD | PARENT FOLDER | NA | NA |
| #320 | FIELD | FOLDER CHILDREN | NA | NA |
| #1100 | COMPANY | DEXIS | #1070 [CONTACTS] | NA |
| #1101 | PERSON | SCOTT WLASCHIN | #1070 [CONTACTS] | NA |
| #1070 | FOLDER | CONTACTS | NA | 1100 [DEXIS]; 1101 [SCOTT WLASCHIN]; 1102 [LOUISE WANNIER]; etc. |

DEFINITIONS FOR FOLDER RELATED COLUMNS

FOLDER CHILDREN IN USE AS AN ATTRIBUTE OF A FOLDER OBJECT — 242

240

138
244

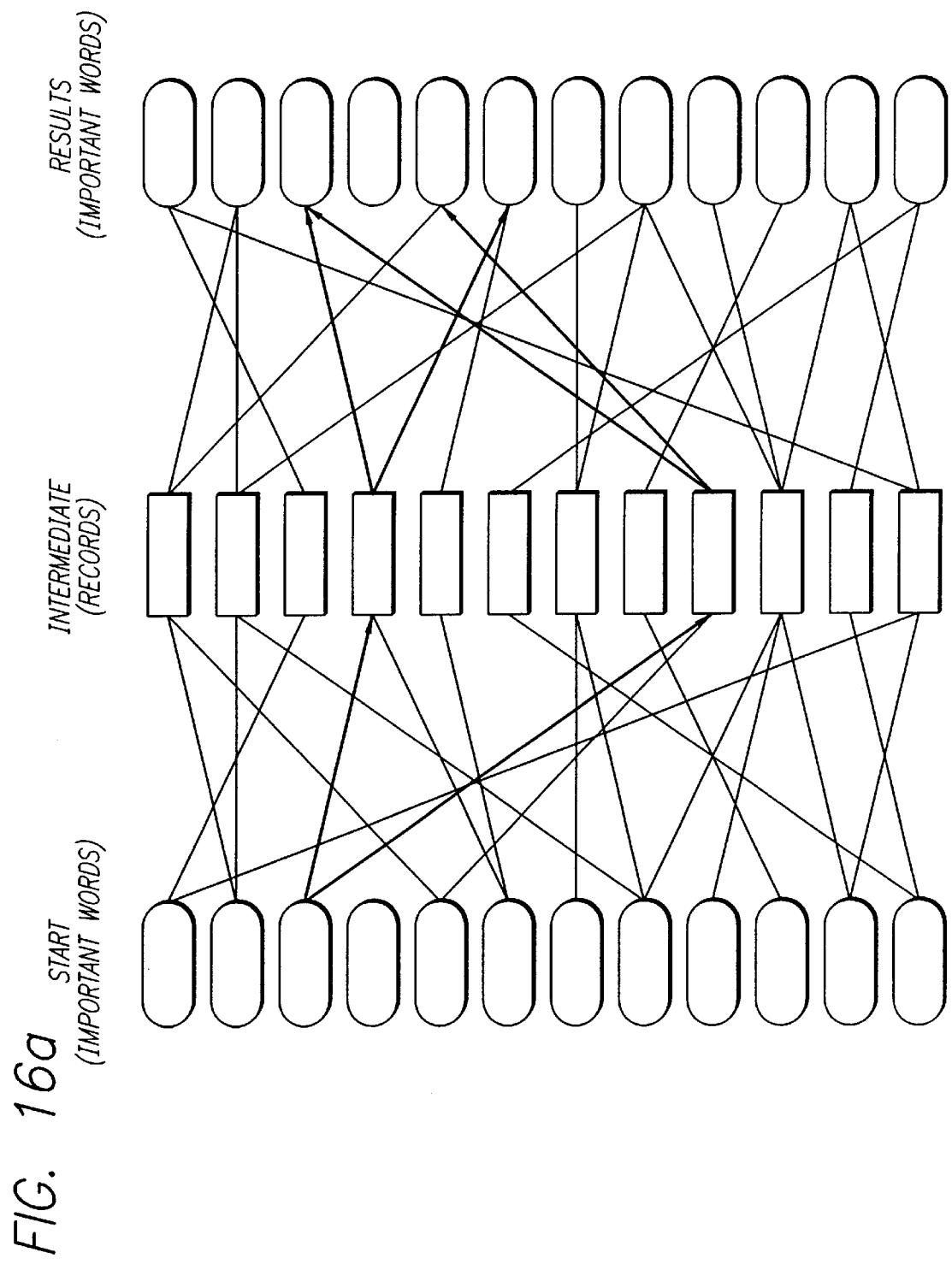

FIG. 17

| OID | #101 [CLASS ID] | #2 [LABEL] | #621 [PARENT CONCEPT] | #701 [CONCEPT NAME] | #702 [SYNONYMS] | #703 [MORE SPECIFIC TERMS] | #704 [MORE GENERAL TERMS] | #705 [SEE ALSO] |
|---|---|---|---|---|---|---|---|---|
| 1203 | TERM | IBM | #1300 [IBM] | | | | | |
| 1204 | TERM | INTER-NATIONAL BUSINESS MACHINES | #1300 [IBM] | | | | | |
| 1300 | CONCEPT | IBM | | #1203 [IBM] | #1203 [IBM]; #1204 [INTER-NATIONAL BUSINESS MACHINES] | #1301 [IBM PC] WEIGHT= 160% | #1303 [COMPUTER COMPANIES] WEIGHT=60% | #1302 [MICROSOFT] WEIGHT=70% |
| 1301 | CONCEPT | IBM PC | | | #1300 [IBM] WEIGHT=50; | | | |
| 1302 | CONCEPT | MICROSOFT | | | | | | #1300 [IBM] WEIGHT=70% |
| 1303 | CONCEPT | COMPUTER COMPANIES | | | | | #1300 [IBM] WEIGHT=100% | |

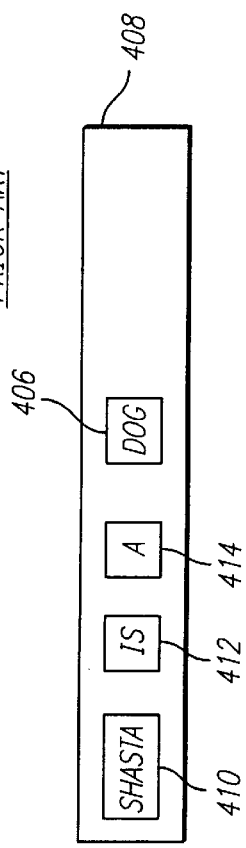
FIG. 19
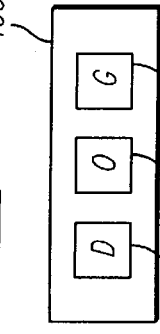
FIG. 20a
PRIOR ART
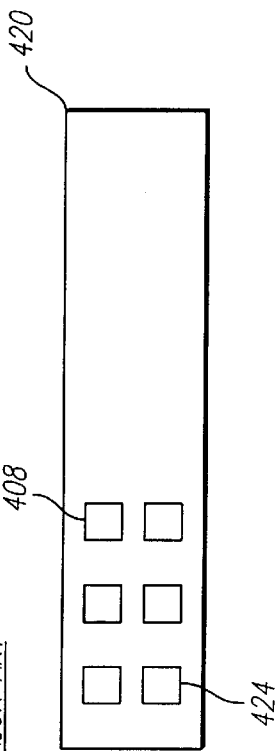
FIG. 20b
PRIOR ART
FIG. 20c
PRIOR ART

FIG. 22b

| KEY PHRASE | SORTED UNDER |
|---|---|
| 3 | 3 |
| 20 | 20 |
| 100 | 100 |
| 1984 | 1984 |
| THE BIG OAK | 'B'-BIG |
| JOHN SMITH | 'J'-JOHN |
| 1984 | 'N'-NINETEEN EIGHTY FOUR |
| THE BIG OAK | 'O'-OAK |
| 100 | 'O'-ONE HUNDRED |
| 1984 | 'O'-ONE THOUSAND NINE HUNDRED |
| JOHN SMITH | 'S'-SMITH |
| 3 | 'T'-THREE |
| 20 | 'T'-TWENTY |
| 2 | 'T'-TWO |

FIG. 22a  PRIOR ART

| KEY PHRASE | SORTED UNDER |
|---|---|
| 100 | '1' |
| 1984 | '1', THEN '9' |
| 20 | '2', THEN '0' |
| 3 | '3' |
| JOHN SMITH | 'J' |
| THE BIG OAK | 'T' |

FIG. 23

| WHEN | COMMENT |
|---|---|
| 12/1/94 | |
| MEET WITH JOHN NEXT MONDAY | |
| CHRISTMAS | |
| JAN 1 | CALL TOMORROW |

IMPORTANT DATES
DEC 1
DEC 24
DEC 25
DEC 30
JAN 1

METHOD AND APPARATUS FOR IMPROVED INFORMATION STORAGE AND RETRIEVAL SYSTEM

RELATED APPLICATIONS

The present application is a Continuation-In-Part of the copending application entitled "Method and Apparatus for Improved Information, Storage and Retrieval Sytem" filed Feb. 3, 1995, Ser. No. 08/383,752 now U.S. Pat. No. 5,729,730, which is herein incorporated by reference.

REFERENCE TO APPENDICES AND COPYRIGHT NOTICE

Although the detailed description provides a complete disclosure of the invention, an Appendix including source and object code disks of the invention is attached to the parent application Ser. No. 08/383,752, filed Feb. 3, 1995, and is incorporated herein by reference. A microfiche appendix, one sheet and 57 frames, containing a sample database printout is attached hereto. The microfiche Appendix contains material protected under copyright law. The material in the microfiche appendix may be reproduced as it appears in the Patent and Trademark Office patent file or records but the owner reserves all other copyright rights in the appendices.

BACKGROUND OF THE INVENTION

1. Field of the Invention

The present invention relates generally to a method and apparatus for storing, retrieving, and distributing various kinds of data, and more particularly, to an improved database architecture and method for using the same.

2. Art Background

Over the past 30 years, computers have become increasingly important in storing and managing information. During this time, many database products have been developed to allow users to store and manipulate information and to search for desired information. The continuing growth of the information industry creates a demand for more powerful databases.

The database products have evolved over time. Initially, databases comprised a simple "flat file" with an associated index. Application programs, as opposed to the database program itself, managed the relationships between these files and a user typically performed queries entirely at the application program level. The introduction of relational database systems shifted many tasks from applications programs to database programs. The currently existing database management systems comprise two main types, those that follow the relational model and those that follow the object oriented model.

The relational model sets out a number of rules and guidelines for organizing data items, such as data normalization. A relational database management system (RDBMS) is a system that adheres to these rules. RDBMS databases require that each data item be uniquely classified as a particular instance of a 'relation'. Each set of relations is stored in a distinct 'table'. Each row in the table represents a particular data item, and each column represents an attribute that is shared over all data items in that table.

The pure relational model places number of restrictions on data items. For example, each data item cannot have attributes other than those columns described for the table. Further, an item cannot point directly to another item. Instead, 'primary keys' (unique identifiers) must be used to reference other items. Typically, these restrictions cause RDBMS databases to include a large number of tables that require a relatively large amount of time to search. Further, the number of tables occupies a large amount of computer memory.

The object oriented database model, derived from the object-oriented programming model, is an alternative to the relation model. Like the relational model, each data item must be classified uniquely as belonging to a single class, which defines its attributes. Key features of the object-oriented model are: 1) each item has a unique system-generated object identification number that can be used for exact retrieval; 2) different types of data items can be stored together; and 3) predefined functions or behavior can be created and stored with a data item.

Apart from the limitations previously described, both the relational and object oriented models share important limitations with regard to data structures and searching. Both models require data to be input according to a defined field structure and thus do not completely support full text data entry. Although some databases allow records to include a text field, such text fields are not easily searched. The structural requirements of current databases require a programmer to predefine a structure and subsequent date entry must conform to that structure. This is inefficient where it is difficult to determine the structure of the data that will be entered into a database.

Conversely, word and image processors that allow unstructured data entry do not provide efficient data retrieval mechanisms and a separate text retrieval or data management tool is required to retrieve data. Thus, the current information management systems do not provide the capability of integrating full text or graphics data entry with the searching mechanisms of a database.

The separation of database from other programs such as word processors has created a large amount of text and other files that cannot be integrated with current databases. Various database, spreadsheet, image, word processing, electronic mail and other types of files may not currently be accessed in a single database that contains all of this information. Various programs provide integration between spreadsheet, word processing and database programs but, as previously described, current databases do not support effective searching in unstructured files.

The present invention overcomes the limitations of both the relational database model and object oriented database model by providing a database with increased flexibility, faster search times and smaller memory requirements and that supports text attributes. Further, the database of the present invention does not require a programmer to preconfigure a structure to which a user must adapt data entry. Many algorithms and techniques are required by applications that deal with these kinds of information. The present invention provides for the integration, into a single database engine, of support for these techniques, and shifts the programming from the application to the database, as will be described below. The present invention also provides for the integration, into a single database, of preexisting source files developed under various types of application programs such as other databases, spreadsheets and word processing programs. In addition, the present invention allows users to control all of the data that are relevant to them without sacrificing the security needs of a centralized data repository.

SUMMARY OF THE INVENTION

The present invention improves upon prior art information search and retrieval systems by employing a flexible, self-referential table to store data. The table of the present invention may store any type of data, both structured and unstructured, and provides an interface to other application programs such as word processors that allows for integration of all the data for such application programs into a single database. The present invention also supports a variety of other features including hypertext.

The table of the present invention comprises a plurality of rows and columns. Each row has an object identification number (OID) and each column also has an OID. A row corresponds to a record and a column corresponds to an attribute such that the intersection of a row and a column comprises a cell that may contain data for a particular record related to a particular attribute. A cell may also point to another record. To enhance searching and to provide for synchronization between columns, column definitions are entered as rows in the table and the record corresponding to a column contains various information about the column. This renders the table self referential and provides numerous advantages, as will be discussed in this Specification.

The present invention includes an index structure to allow for rapid searches. Text from each cell is stored in a key word index which itself is stored in the table. The text cells include pointers to the entries in the key word index and the key word index contains pointers to the cells. This two way association provides for extended queries. The invention further includes weights and filters for such extended queries.

The present invention includes a thesaurus and knowledge base that enhances indexed searches. The thesaurus is stored in the table and allows a user to search for synonyms and concepts and also provides a weighting mechanism to rank the relevance of retrieved records.

An application support layer includes a word processor, a password system, hypertext and other functions. The novel word processor of the present invention is integrated with the table of the present invention to allow cells to be edited with the word processor. In addition, the table may be interfaced with external documents which allows a user to retrieve data from external documents according to the enhanced retrieval system of the present invention.

These and numerous other advantages of the present invention will be apparent from the following description.

BRIEF DESCRIPTION OF THE DRAWINGS

FIG. 3 illustrates the table structure of the database of the present invention.

FIG. 8a illustrates a reference within one column to another column.

FIG. 8b illustrates an alternate embodiment for referring to another column within a column.

FIG. 9 illustrates a "Record Contents" column of the present invention that indicates which columns of a particular record have values.

FIG. 10 illustrates a folder structure that organizes records. The folder structure is stored within the table of FIG. 2.

FIG. 16a illustrates an extended search in graphical form.

FIG. 17 illustrates the thesaurus structure of the present invention stored in the table of FIG. 2.

FIG. 18 illustrates prior art hypertext.

FIG. 19 illustrates the hypertext features of the present invention.

FIG. 20a illustrates a character and word box structure of the word processor of the present invention.

FIG. 20b illustrates the word and horizontal line box structure of the word processor of the present invention.

FIG. 20c illustrates the vertical box structure of the word processor of the present invention.

FIG. 22a illustrates the results of a prior art sorting algorithm.

FIG. 22b illustrates the results of a sorting algorithm according to the present invention.

FIG. 23 illustrates the correspondence between cells of the table of FIG. 2 and a sorted date index.

NOTATION AND NOMENCLATURE

Figure 1:
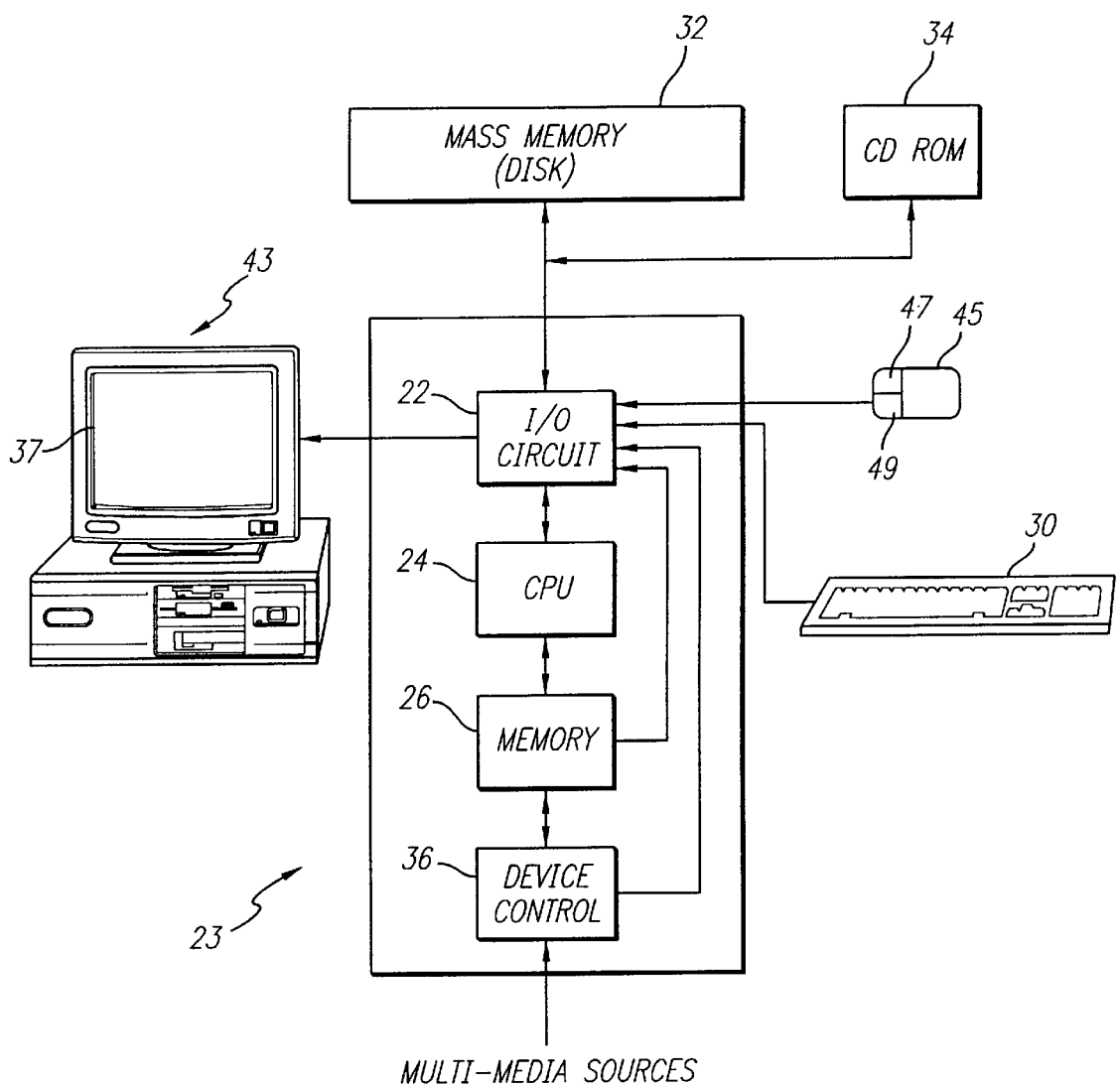
FIG. 1 is a functional block diagram illustrating one possible computer system incorporating the teachings of the present invention.

The detailed descriptions which follow are presented largely in terms of algorithms and symbolic representations of operations on data bits within a computer memory. These descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar digital devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

The present invention discloses methods and apparatus for data storage, manipulation and retrieval. Although the present invention is described with reference to specific block diagrams, and table entries, etc., it will be appreciated by one of ordinary skill in the art that such details are disclosed simply to provide a more thorough understanding of the present invention. It will therefore be apparent to one skilled in the art that the present invention may be practiced without these specific details.

System Hardware

Referring to FIG. 1, the hardware configuration of the present invention is conceptually illustrated. FIG. 1 illustrates an information storage and retrieval system structured in accordance with the teachings of the present invention. As illustrated, the information storage and retrieval system includes a computer 23 which comprises four major components. The first of these is an input/output (I/O) circuit 22, which is used to communicate information in appropriately structured form to and from other portions of the computer 23. In addition, computer 20 includes a central processing unit (CPU) 24 coupled to the I/O circuit 22 and to a memory 26. These elements are those typically found in most computers and, in fact, computer 23 is intended to be representative of a broad category of data processing devices.

Also shown in FIG. 1 is a keyboard 30 for inputting data and commands into computer 23 through the I/O circuit 22, as is well known. Similarly, a CD ROM 34 is coupled to the I/O circuit 22 for providing additional programming capacity to the system illustrated in FIG. 1. It will be appreciated that additional devices may be coupled to the computer 20 for storing data, such as magnetic tape drives, buffer memory devices, and the like. A device control 36 is coupled to both the memory 26 and the I/O circuit 22, to permit the computer 23 to communicate with multi-media system resources. The device control 36 controls operation of the multi-media resources to interface the multi-media resources to the computer 23.

A display monitor 43 is coupled to the computer 20 through the I/O circuit 22. A cursor control device 45 includes switches 47 and 49 for signally the CPU 24 in accordance with the teachings of the present invention. A cursor control device 45 (commonly referred to a "mouse") permits a user to select various command modes, modify graphic data, and input other data utilizing switches 47 and 49. More particularly, the cursor control device 45 permits a user to selectively position a cursor 39 at any desired location on a display screen 37 of the display 43. It will be appreciated that the cursor control device 45 and the keyboard 30 are examples of a variety of input devices which may be utilized in accordance with the teachings of the present invention. Other input devices, including for example, trackballs, touch screens, data gloves or other virtual reality devices may also be used in conjunction with the invention as disclosed herein.

System Architecture

Figure 2:
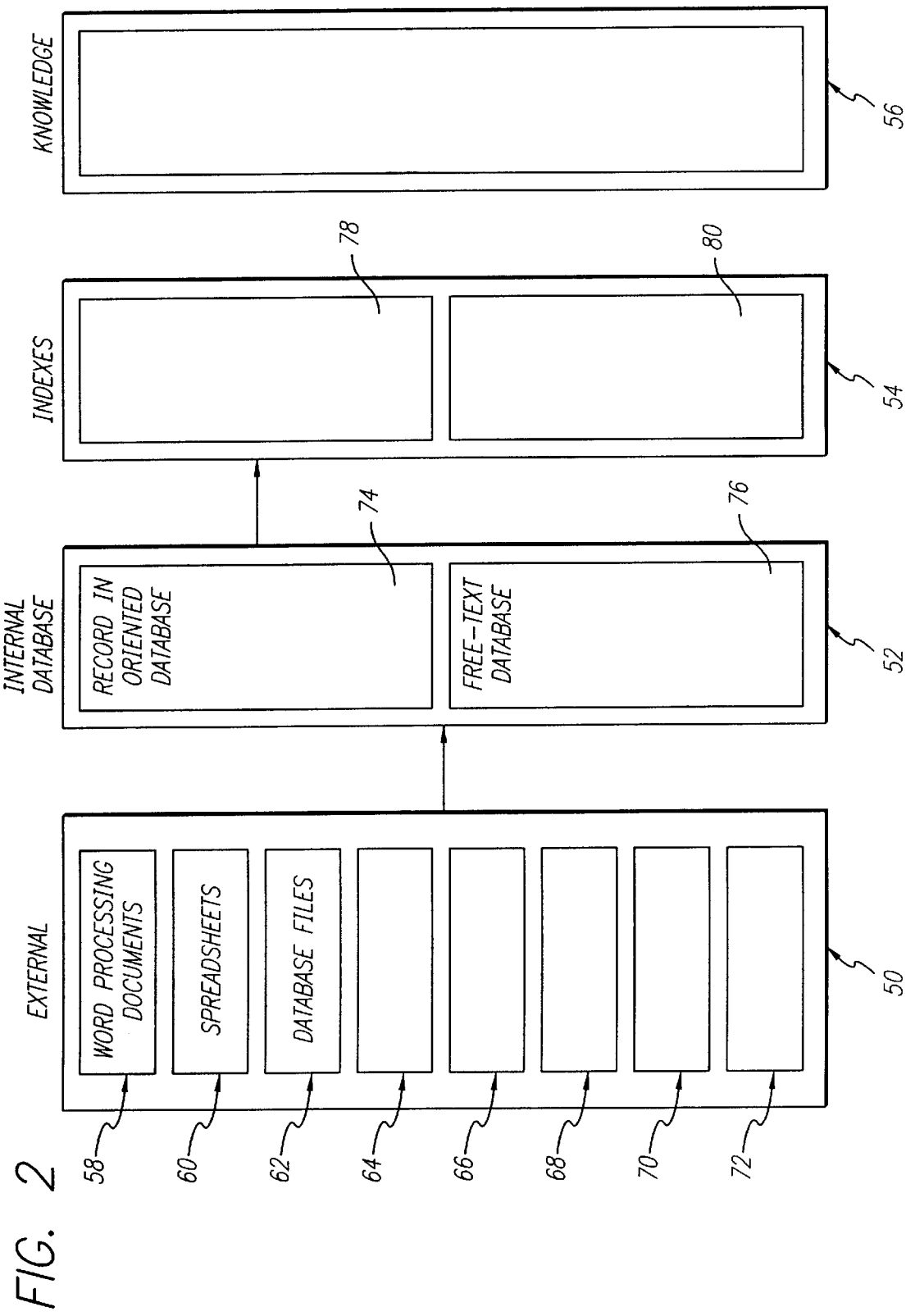
FIG. 2 is a block diagram illustrating the main components of the present invention.

FIG. 2 is a block diagram of the information storage and retrieval system of the present invention. As illustrated in the Figure, the present invention includes an internal database 52 that further includes a record oriented database 74 and a free-text database 76. The database 52 may receive data from a plurality of external sources 50, including word processing documents 58, spreadsheets 60 and database files 62. As will be described more fully below, the present invention includes an application support system that interfaces the external sources 50 with the database 52.

To efficiently retrieve information stored in the database 52, a plurality of indexes 54 including a keyword index 78 and other types of indexes such as phonetic, special sorting for other languages, and market specific such as chemical, legal and medical, store sorted information provided by the database 52. To organize the information in the indexes 54, a knowledge system 56 links information existing in the indexes 54.

The organization illustrated in FIG. 2 is for conceptual purposes and, in actuality, the database 52, the indexes 54 and the knowledge system 56 are stored in the same table, as will be described more fully below. This Specification will first describe the structure and features of the database 52. Next, the Specification will describe the index 54 and its implementation for searching the database 52. The Specification will then describe the knowledge system 56 that further enhances the index 54 by providing synonyms and other elements. Finally, the Specification will describe an interface between the external application programs 50 and the database 52, including a novel structured word processor and a novel password scheme.

FIG. 3 illustrates the storage and retrieval structure of the present invention. The storage and retrieval structure of the present invention comprises a table 100. The structure of the table 100 is a logical structure and not necessarily a physical structure. Thus, the memories 26 and 32 configured according to the teachings of the present invention need not store the table 100 contiguously.

The table 100 further comprises a plurality of rows 110 and a plurality of columns 120. A row corresponds to a record while a column corresponds to an attribute of a record and the defining characteristics of the column are stored in a row 108. The intersection of a row and a column comprises a particular cell.

Each row is assigned a unique object identification number (OID) stored in column 120 and each column also is assigned a unique OID, indicated in brackets and stored in row 108. For example, row 110 has an OID equal to 1100 while the column 122 has an OID equal to 101. As will be described more fully below, the OID's for both rows and columns may be used as pointers and a cell 134 may store an OID. The method for assigning the OID's will also be discussed below.

As illustrated in FIG. 3, each row, corresponding to a record, may include information in each column. However, a row need not, and generally will not, have data stored in every column. For example, row 110 corresponds to a company as shown in a cell 130. Since companies do not have titles, cell 132 is unused.

The type of information associated with a column is known as a 'domain'. Standard domains supported in most database systems include text, number, date, and Boolean. The present invention includes other types of domains such as the OID domain that points to a row or column. The present invention further supports 'user-defined' domains, whereby all the behavior of the domain can be determined by a user or programmer. For example, a user may configure a domain to include writing to and reading from a storage medium and handling operations such as equality testing and comparisons.

According to the present invention, individual cells may be accessed according to their row and column OID's. That is, the cell (or intersection between the rows and columns) is the unit of storage and management, not the record (or row) as is standard in the prior art. Using the cell as the unit of storage improves many standard data management operations that previously required the entire object or record. Such operations include versioning, security, hierarchical storage management, appending to remote partitions, printing, and other operations.

Column Definitions

Each column has an associated column definition, which determines the properties of the column, such as the domain of the column, the name of the column, whether the column is required and other properties that may relate to a column. The table 100 supports columns that include unstructured, free text data.

The column definition is stored as a record in the table 100 of FIG. 3. For example, the "Employed By" column 126 has a corresponding row 136. The addition or rows that correspond to columns renders the table 100 self-referential. New columns may be easily appended to the table 100 by creating a new column definition record. The new column is then immediately available for use in existing records.

Dates

Dates can be specified numerically and textually. An example of a numerical date is "11/6/67" and an example of a textual date is "November 6, 1967." Textual entries are converted to dates using standard algorithms and lookup tables. A date value can store both original text and the associated date to which the text is converted, which allows the date value to be displayed in the format in which it was originally entered.

Numbers

Numeric values are classified as either a whole number (Integer) or fractional number. In the preferred embodiment, Integers are stored as variable length structures, which can represent arbitrarily large numbers. All data structures and indexes use this format which ensures that there are no limits in the system.

Fractional numbers are represented by a <numerator/denominator> pair of variable length integers. As with dates, a numeric value can store both the original text ("4½ inches") and the associated number(4.5). This allows the numeric value to be redisplayed in the format in which it was originally entered.

Type Definitions

A record can be associated with a 'record type'. The record type can be used simply as a category, but also can be used to determine the behavior of records. For example, the record type might specify certain columns that are required by all records of that type and, as with columns, the type definitions are stored as records in the table 100. In FIG. 3, column 122 includes the type definition for each record. The column 122 stores pointers to rows defining a particular column type. For example, the row 136 is a "Field" type column and contains a pointer in a cell 133 to a row 135 that defines "Field" type columns. The "Type Column" 122 of the row 135 points to a type called "Type," which is defined in a row 140. "Type" has a type column that points to itself.

Record types, as defined by their corresponding rows, may constrain the values that a record of that type may contain. For example, the record type 'Person' may require that records of type 'Person' have a valid value in the 'Name' column, the 'Phone' column, and any other columns. The type of a record is an attribute of the record and thus may change at any time.

Template Definitions

A template is a special record that comprises a description and a list of fields. For example, a Contact template might consist of the fields: "First Name", "Last Name", "Phone". Templates are used for conveniently labeling a group of fields. A template can be used for various purposes, such as determining which fields to use when editing a record, printing a record, searching for a record, or exporting a record. More sophisticated templates can contain layout information that is used when editing or printing a record.

As any record can contain any field, so any template can be applied to any record, even if some fields may be 'inappropriate' for the type of record. For example, when printing a collection of records, the same template may be applied to all the records in the collection, even if the records are of different types.

A record can be associated with a particular 'default template'. This template is used as the default when editing, printing, and exporting the record.

Creating a Unique OID

Figure 4:
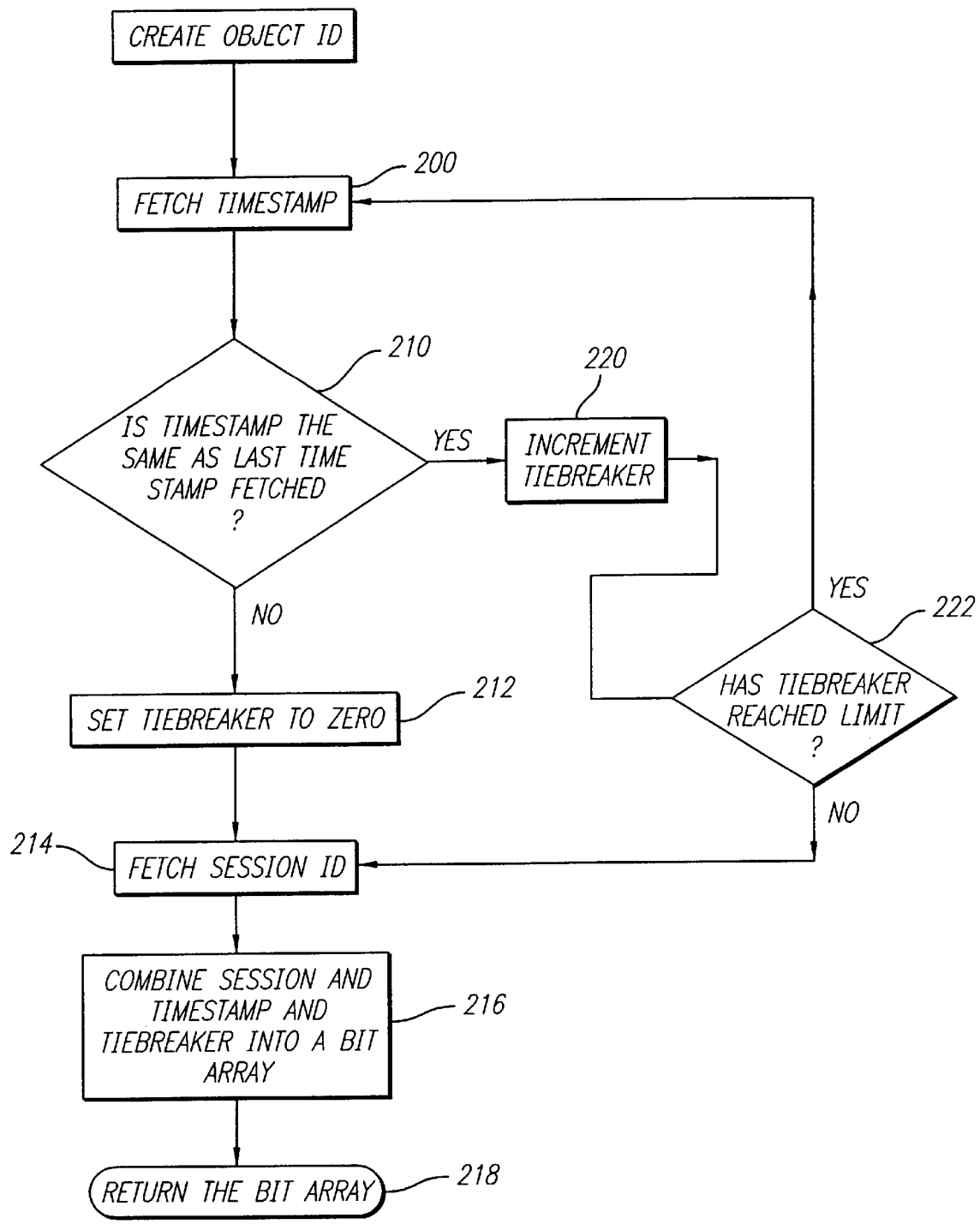
FIG. 4 is a flow chart for a method of computing object identification numbers (OID's) that define rows and columns in the table of FIG. 1.

As previously described, the system must generate a unique OID when columns and rows are formed. FIG. 4 is a flow chart of the method for assigning OID's.

At block 200 of FIG. 4, the CPU 24 running the database program stored in the memory 26 requests a timestamp from the operating system. At block 210, the system determines whether the received timestamp is identical to a previous timestamp. If the timestamps are identical, block 210 branches to block 220 and a tiebreaker is incremented to resolve the conflict between the identical timestamps. At block 222, the system determines whether the tiebreaker has reached its limit, and, if so, the system branches to block 200 to retrieve a new time stamp. Otherwise, the system branches to block 214 where the system requests a session identification which is unique to the user session.

In the preferred embodiment, the session identification is derived from the unique serial number of the application installed on the users machine. For certain OID's which are independent of any particular machine, the session identification may be used to determine the type of object. For example, dates are independent of any particular machine, and so an OID for a date may have a fixed session identification.

Returning to block 210, if the timestamps are not identical, control passes to block 212 where the tiebreaker is set to zero and control then passes to block 214. As previously described, at block 214, the system requests a session identification which is unique to the user session. Control then passes to block 216 where the session identification, timestamp and tiebreaker are combined into a bit array, which becomes the OID. Since the OID is a variable length structure, any number of bits may be used, depending on the precision required, the resolution of the operating system clock, and the number of users. In the preferred embodiment, the OID is 64 bits long where the timestamp comprises the first 32 bits, the tiebreaker comprises the next 10 bits and the session identification comprises 22 bits.

The particular type of OID and its length is constant throughout a single database but may vary between databases. A flag indicating which type of OID to be used may be embedded in the header of each database.

OID Domains

OID domains are used to store OID's, which are pointers to other records. An efficient query can use these OID's to go directly to another record, rather than searching through columns.

If a user wishes to search a column to find a record or records with a certain item in the column, and does not know the OID of the item, the present invention includes a novel technique for determining an OID from the textual description. Conversion from text to an OID may also be necessary when a user is entering information into a record. For example, in FIG. 3, the user may be entering information in the "Employed By" column 126, and wish to specify the text "DEXIS" and have it converted to OID #1100. For this purpose, special columns are required that provide a definition for how the search and conversion is performed.

Figure 5:
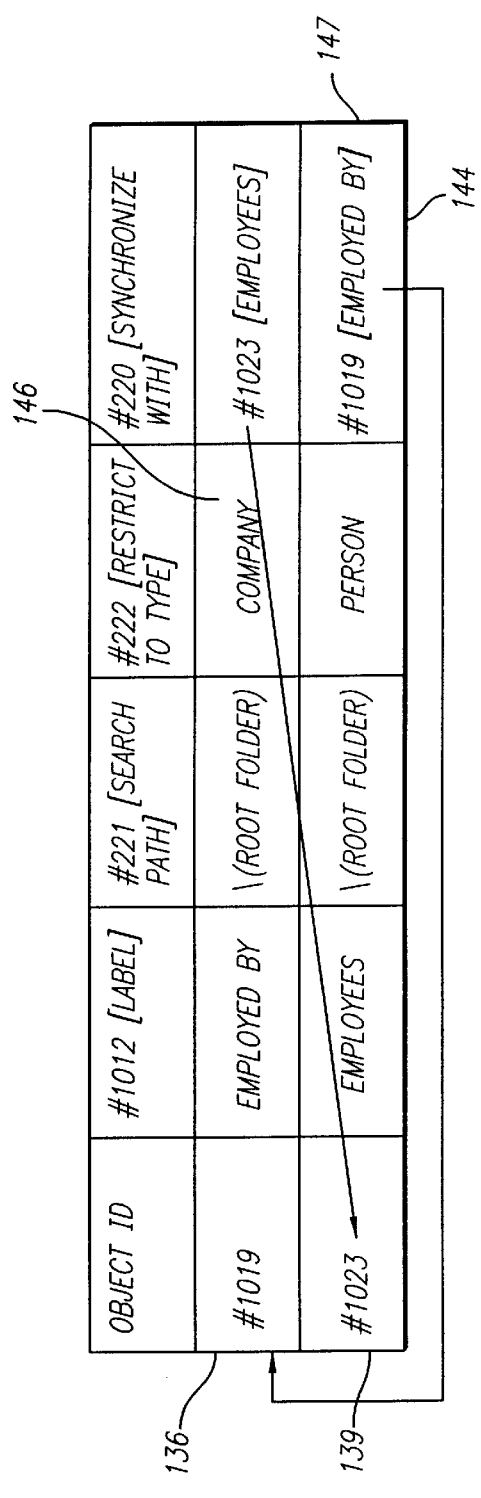
FIG. 5 is a part of the table of FIG. 2 illustrating the column synchronization feature of the present invention.
Figure 6:
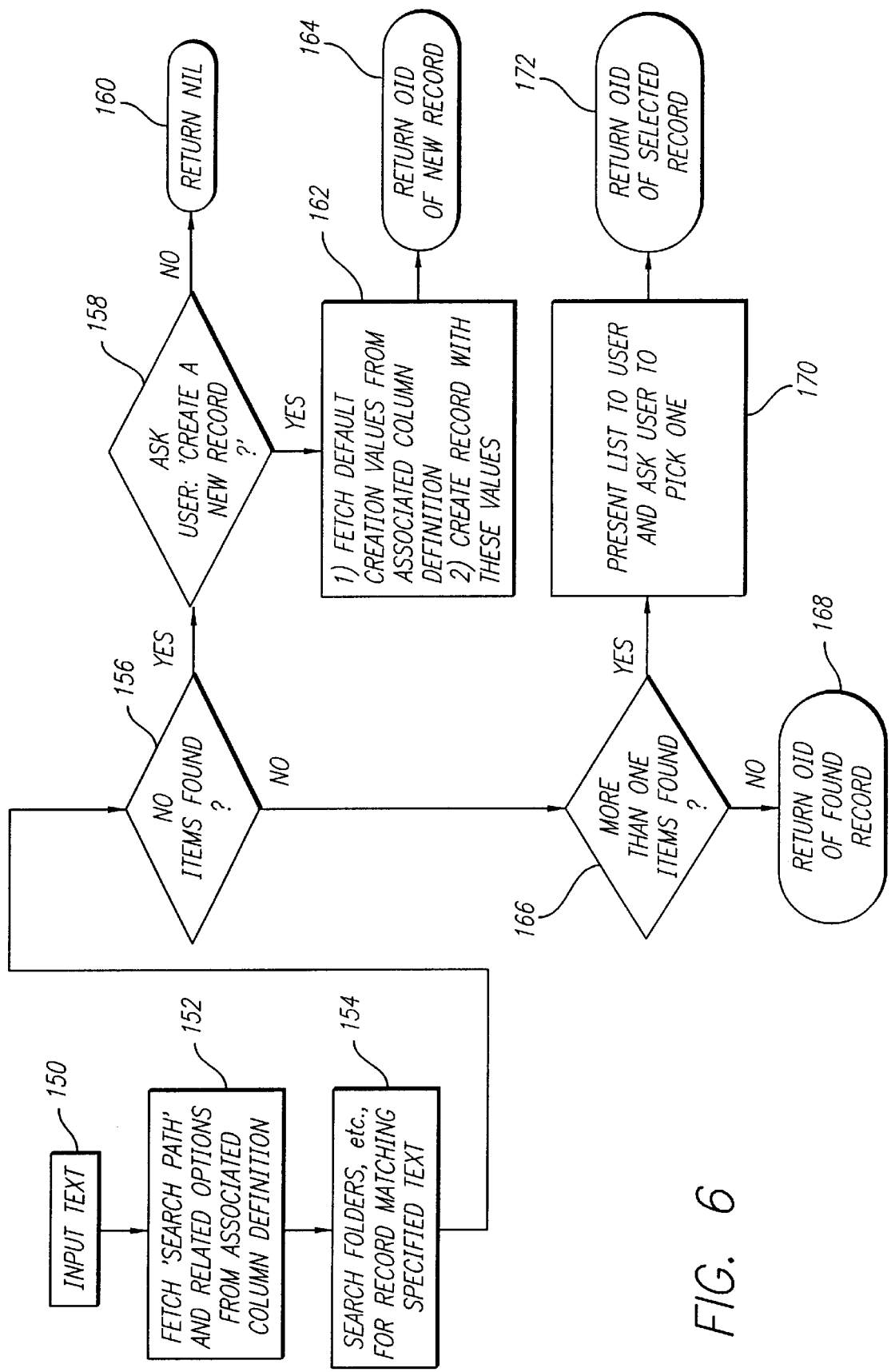
FIG. 6 is a flow chart for a method of searching the table of FIG. 2.

FIG. 6 is a flow chart for searching the table 100 configured according to the structure illustrated in FIG. 5. At block 150, a user enters text through the keyboard 30 or mouse 45 for a particular column that the user wishes to search. At block 152, the system retrieves the search path for the column to be searched from the information stored in column 146 as illustrated in FIG. 5. Continuing with the above example, a cell 146 in the row 136 contains the search path information for the "Employed By" column 126 of FIG. 3. The search path information for the "Employed By" field indicates that the folders called "\contacts" and "\departments" should be searched for a company with the label "DEXIS."

Returning to FIG. 5, the system searches the table 100 according to the retrieved search path information. For each folder specified in the search path, the routine searches for a record that has an entry in the label column 124 of FIG. 2 that is the same as the text being searched for, and is of the same class, as indicated in column 122 of FIG. 3. Folders will be further described below.

At block 156, the system determines whether it has found any items matching the user's search text. If no items have been found, at block 158, the system prompts the user on the display screen 37 to create a new record. If the user wishes to create a new record, control passes to block 162 and the system creates a new record. At block 164, the OID of the new record is returned. If the user does not wish to create a new record, a "NIL" string is returned, as shown at block 160.

If the system has located at least one item, the system determines whether it has found more than one item, as illustrated in block 166. If only one item has been located, its OID is returned at block 168. If more than one item has been located, the system displays the list of items to the user at block 170 and the user selects a record from the list. At block 172, the OID of the selected record is returned, which, in the above example, is #1100, the OID of the record for the company "DEXIS."

In alternate embodiments, various features may be added to the search mechanism as described with reference to FIG. 6. For example, further restrictions may be added to the search; the search may be related by allowing prefix matching or fuzzy matching instead of strict matching; and the search may be widened by using the 'associative search' techniques described below.

Two Way Synchronized Links

Records may have interrelationships and it is often desirable to maintain consistency between interrelated records. For example, a record including data for a company may include information regard employees of that company, as illustrated in row 110 of FIG. 3. Similarly, the employees that work for that company may have a record that indicates, by a pointer, their employer, as illustrated by row 138 of FIG. 3. Thus, the employee column of a company should point to employees whose employer column points to that company. The present invention includes a synchronization technique to ensure that whenever interrelated records are added or removed, the interrelationships between the columns are properly updated.

The system synchronizes interrelated records by adding a "Synchronize With" column 144 to the table 100 as illustrated in FIG. 5. Since the value in the columns defines the relatedness between records, the rows 136 and 139 corresponding to columns contain information within the "Synchronize With" column 144 that indicates which other columns are to be synchronized with the columns corresponding to rows 136 and 139. With reference to FIG. 5, the "Employed By" column 126 is synchronized with the "Employees" column by an OID pointer in the "Synchronize With" column 144 to the "Employees" column, represented by row 139. Similarly, the "Employees" column is synchronized with the "Employed By" column 136 by a pointer in the "Synchronize With" column 144 to the "Employed by" column 134, represented by row 136. Thus, whenever an employee changes companies, such that the employee's "Employed By" column changes, the "Employee" column of the previous employer is updated to eliminate the pointer to the ex-employee and, correspondingly, the addition of the employee in the "Employed By" field of the new employer. Synchronization may need to occur whenever a column is changed, whether by addition or subtraction of a reference to another column, or when entire records are added or eliminated from the table 100.

Figure 7B:
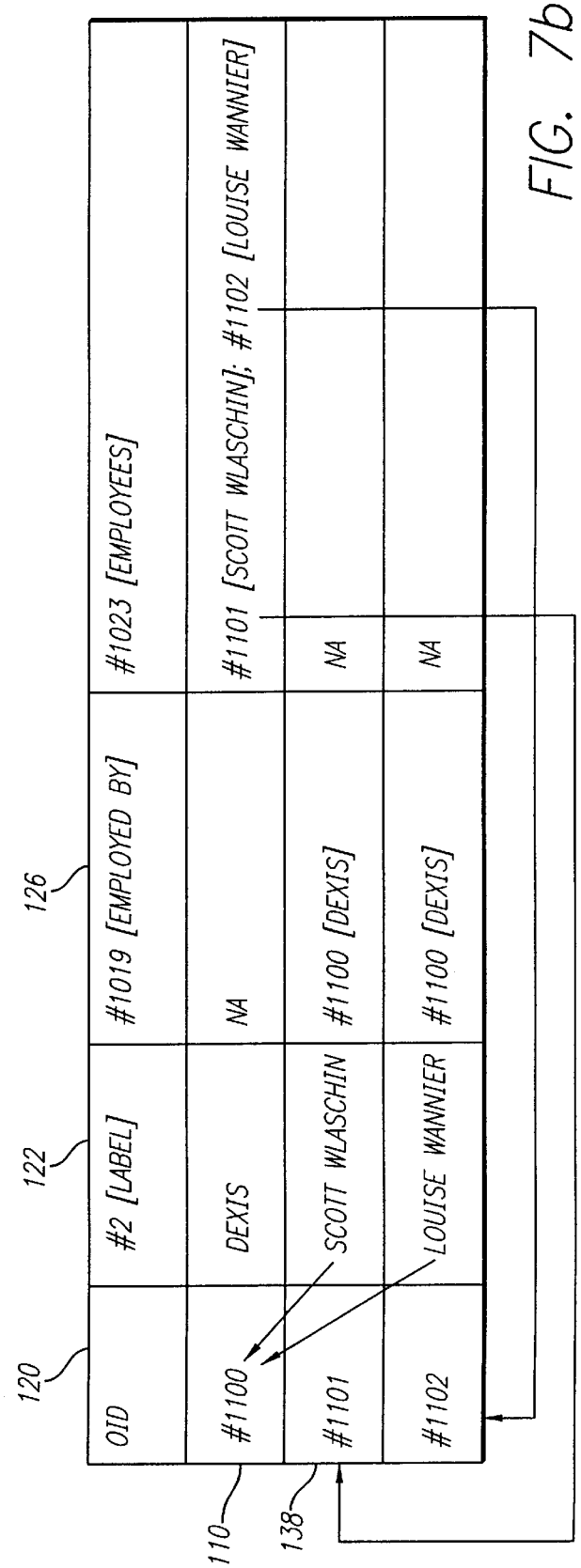
FIG. 7b illustrates the results of column synchronization.
Figure 7A:
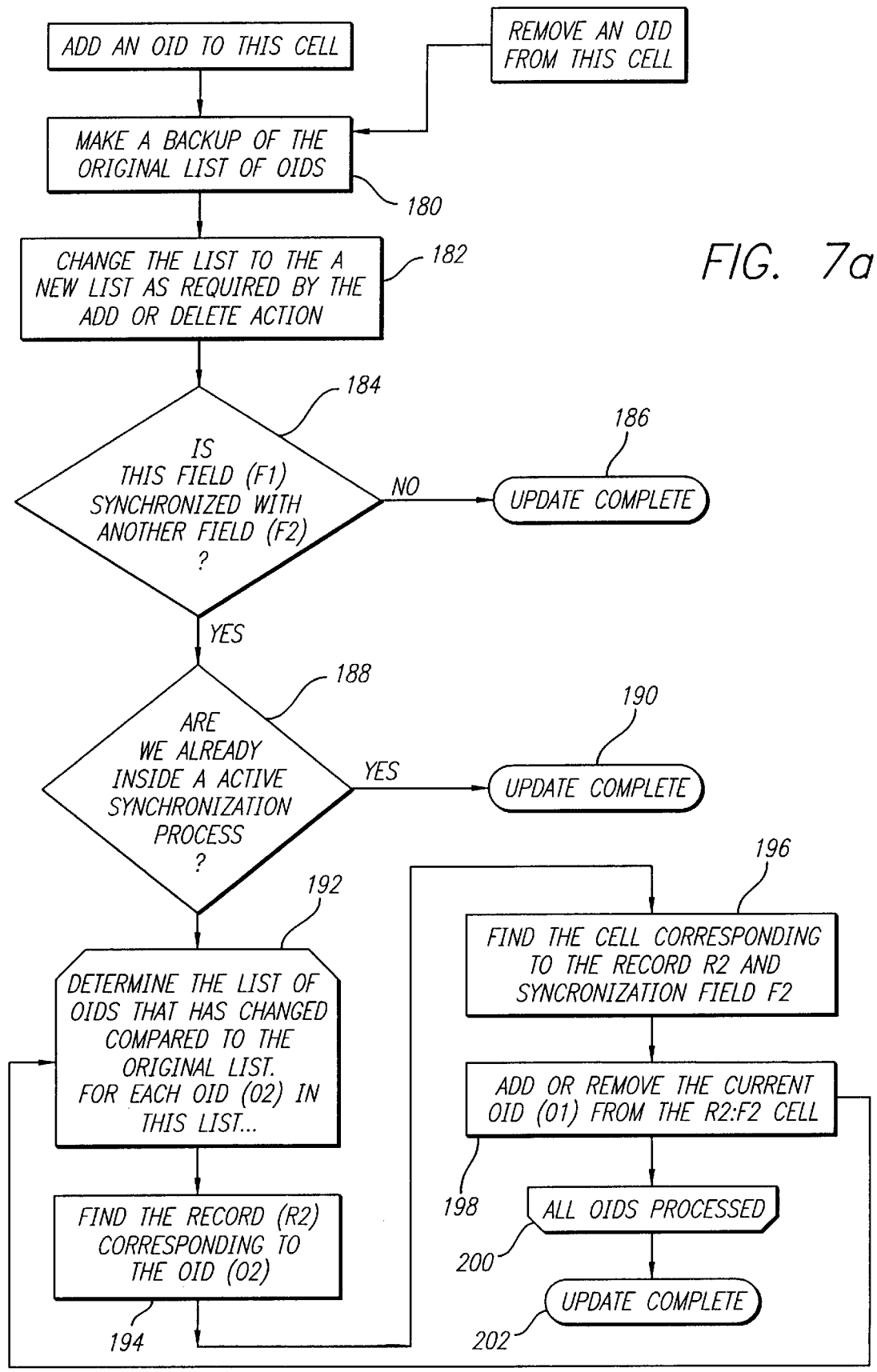
FIG. 7a is a flow chart for synchronizing columns of the table of FIG. 2.

FIG. 7a is a flow chart for synchronizing records when a user adds or deletes a record. At block 180, the system makes a backup of the original list of references to other rows, which are simply the OID's of those other rows, so that it can later determine which OIDS have been added or removed. Only these changes need to be synchronized. At block 182, the system generates a new list of references by adding or deleting the specified OID. At block 184, the system determines whether the relevant column is synchronized with another column. If it is not, then the system branches to block 186 and the update is complete. If the column is synchronized with another column, the system determines whether it is already in a synchronization routine. If this were not done, the routine would get into an endless recursive loop. If the system is already in a synchronization routine, the system branches to 190 and the update is complete.

Otherwise, the system performs actual synchronization. At block 192, the system finds an OID that has been added or subtracted from the column (C1) of the record (R1) being altered. The system retrieves the record (R2) corresponding to the added or subtracted OID at block 194. The system determines the synchronization column (C2) of the column (C1) at block 196 and locates that field in the added or subtracted OID. For example, if an employer is fired from a job, and the employer's "Employed By" field changed accordingly, the system would look up the value of the "Synchronize With" column 144 for the "Employees" column which is contained in the cell 147 as illustrated in FIG. 5. Since cell 147 points to the "Employed By" field, the system locates the "Employed By" field of the record for the fired employee. At block 198 of FIG. 7*a*, the located cell, (R2:C2), is updated by adding or subtracting the OID. Continuing with the above example, the "Employed By" field of the employee would be changed to no longer point to the previous employer by simply removing the employer's OID from that field. The system branches back to block 192 to update any other OID additions or subtractions. If the system has processed all of the OID's, then the routine exits as illustrated at blocks 200 and 202.

FIG. 7*b* illustrates the results of column synchronization of the "Employed By" field and the "Employees" field. As shown, the pointers in the records of these two columns are consistent with one another.

Columns Within Columns

A column may contain within it a reference to another column in the same record. For example, a 'name' column may contain a reference to both a 'first name' and a 'last name' column. The value of the 'name' column can then be reconstructed from the values of the other two columns. FIGS. 8*a* and 8*b* illustrate two possible implementations for reconstructing a value from one or more columns within the same record.

FIG. 8*a* illustrates a table 210 that includes a "First Name" column 220, a "Last Name" column 222 and a "Name" column 224. A record 226 for "John Smith" has the first name "John" in the "First Name" column 220 and the last name "Smith" in the column 222. The name field 224 returns the text "The name is John Smith" by referencing the fields in brackets, according to the format <fieldRef field= 'Column Name'> as shown in column 224.

FIG. 8*b* employs a variant of the referencing scheme illustrated in FIG. 8*a*. FIG. 8*a* illustrates a table 230 that includes a "First Name" column 232, a "Last Name" column 234 and a "Name" column 236. A record 238 for "John Smith" has the first name "John" in the "First Name" column 232 and the last name "Smith" in the column 234. The name field 236 returns the text "The name is John Smith" by referencing the fields by defined variables 'fn' and 'ln' as shown in column 236. The variables are defined according to the format variable := fieldAt (parameter, 'Column Name') and the variables may be referenced in a return statement as shown in column 236.

Record Contents

As previously described, a given row may contain values for any column. However, to determine all of the columns that might be used by a record would involve scanning every possible column. To avoid this problem, in the preferred embodiment, the table 100 illustrated in FIG. 3 includes a "RecordContents" column that indicates those columns within which a particular record has stored values.

FIG. 9 illustrates the table 100 with a "RecordContents" column 127 that includes pointers to the columns containing values for a particular record. For example, the "Record-Contents" column 127 for row 110 has pointers to the column 124 and a column 125 but does not have a pointer to the column 126 because the row 110 does not have a value for the column 126. As previously described, since every column has a corresponding row that defines the column, the "RecordContents" column 127 has a defining row 129. Like any cell, the cell containing the record contents can be versioned, providing the ability to do record versioning.

Folders

To provide increased efficiency in managing information, the table 100 includes a data type defined as a folder. FIG. 10 illustrates the structure of a folder. As illustrated in the Figure, the table 100 includes a "Parent Folder" column 240 and a "Folder Children" column 242. A folder has a corresponding record. For example, a folder entitled "Contacts" has a corresponding row 244 as illustrated in FIG. 10. The "Folder Children" column 242 of the "Contacts" folder includes pointers to those records that belong to the folder. Similarly, those records that belong to a folder include a pointer to that folder in the "Parent Folder" column 240.

A particular record can belong to any number of folders. The folder structure illustrated in FIG. 10 facilitates searching. As previously described, a column may be searched according to a folder specified in the column definition. If a folder is searched, the system accesses the record corresponding to the folder and then searches all of the records pointed to by that folder.

Further, the synchronization feature described above may be used to generate the list of items in a folder. For example, in FIG. 10, the 'Folder Parent' and 'Folder Children' columns may be synchronized. When the 'Folder Parent' field 240 for record 138 is set to reference the 'Contacts' folder represented by row 244, the list of items in the 'Contacts' folder ('FolderChildren') is automatically updated to store a reciprocal reference to record represented by row 138 by including its OID, 1100, in the "Folder Children" column 242.

Automatic Folders

Certain folders are defined such that their contents are automatically determined. This is an 'index' folder or 'query' folder, depending on the type of definition. An index folder contains all records that contain a valid value in a certain field.

For example, a "People" folder may defined such that it automatically contains all records of type "Person".

Furthermore, these definitions can be combined into a more complex definition, called a query. An example of such a folder is a folder that automatically contains a) all records of type "Person" that also b) contain the word "California".

Such automatic folders facilitate the use of the system by automatically filing and organizing records of interest, without requiring an explicit action from the user.

Text Indexing System

The present invention includes an indexing system that provides for rapid searching of text included in any cell in the table 100. Each key phrase is extracted from a cell and stored in a list format according to a predefined hierarchy. For example, the list may be alphabetized, providing for very rapid searching of a particular name.

Figure 11:
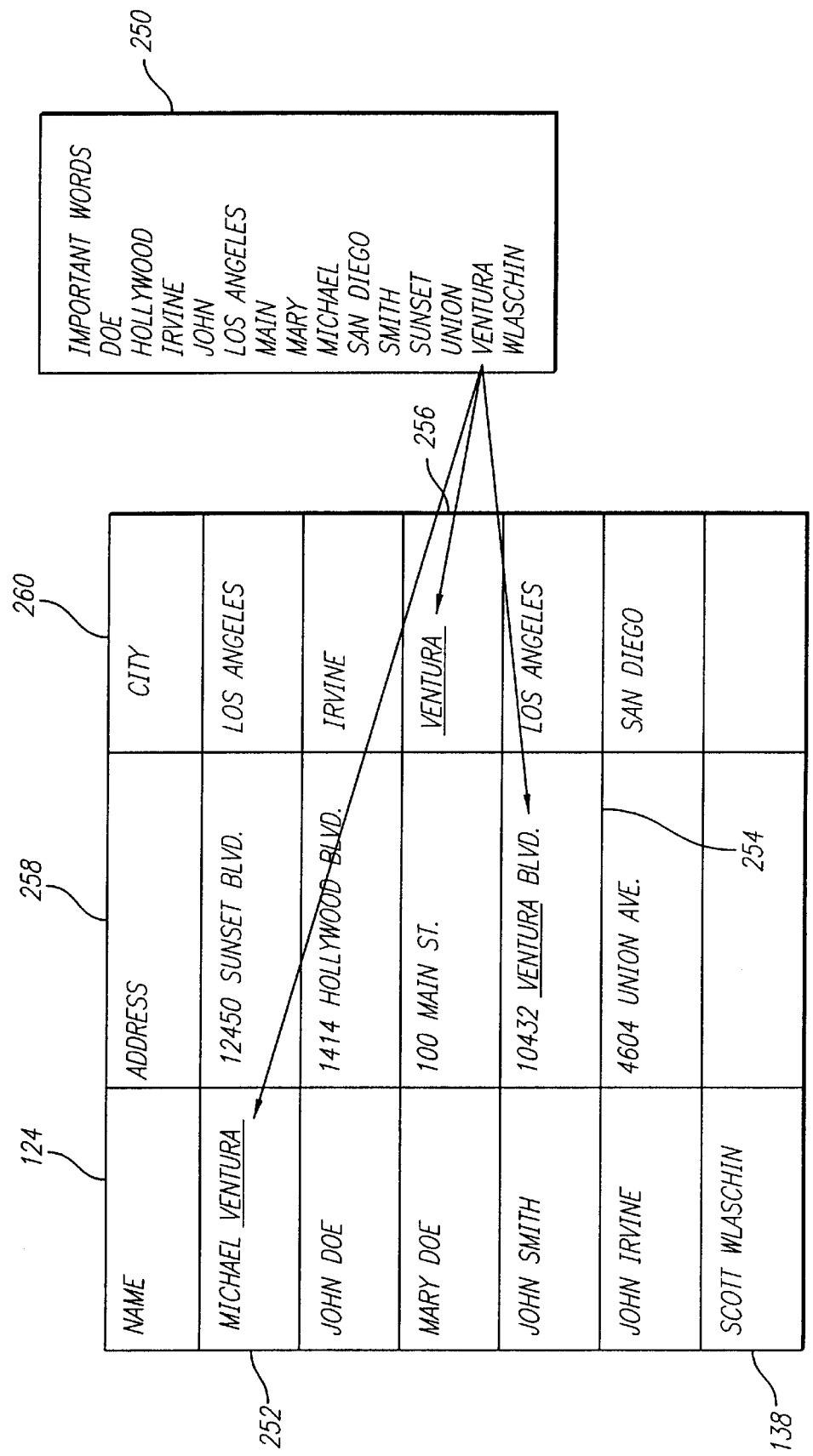
FIG. 11 illustrates the correspondence between cells of the table of FIG. 2 and a sorted key word index.

FIG. 11 illustrates the extraction of text from the table 100 to a list 250. The list 250 is shown separately from the table 100 for purposes of illustration but, in the preferred embodiment, the list 250 comprises part of the table 100. The list 250 stores cell identification numbers for each word in the list where a cell identification number may be of the format <record OID, column OID>. For example, the word "Ventura" occurs in cells 252, 254 and 256 that correspond to different rows and different columns. The word "Ventura" in the list 250 contains a pointer, or cell identification number, to cells 252, 254 and 256.

Figure 12:
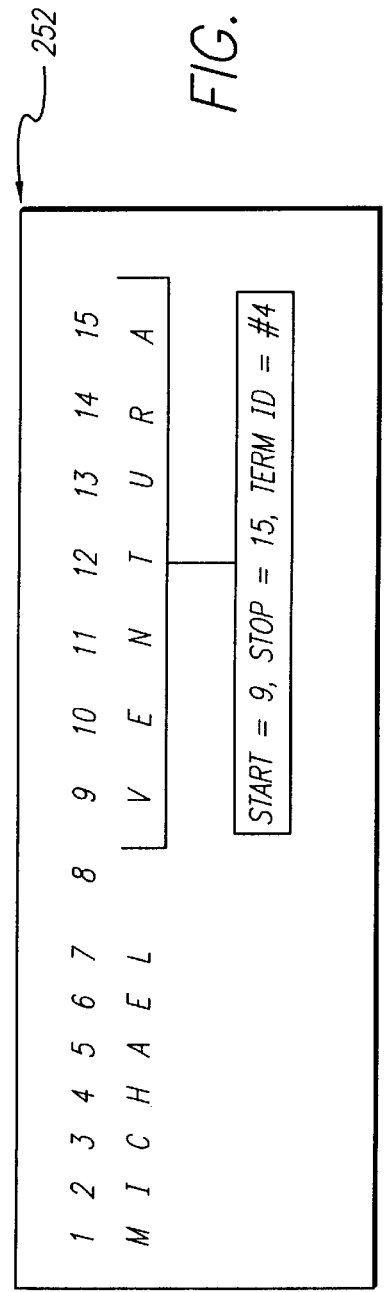
FIG. 12 illustrate the "anchors" within a cell that relate a word in a cell to a key word index record.

Similarly, each cell stores the references to the key phrases within it using 'anchors'. As illustrated in FIG. 12, an anchor contains a location (such as the start and stop offset within the text), and an identification number. Both the text and the anchor are stored in the cell 252. Other kinds of domains also support anchors. For example, graphical images support the notion of 'hot spots' where the anchor position is a point on the image.

As previously described, each key phrase is stored as a record in the database and the OID of the record equals the identification number described with reference to FIG. 12. One column stores the name of the key phrase and another stores the list of cell identification numbers that include that phrase. Key phrases may have comments of their own, which may also be indexed.

Figure 13:
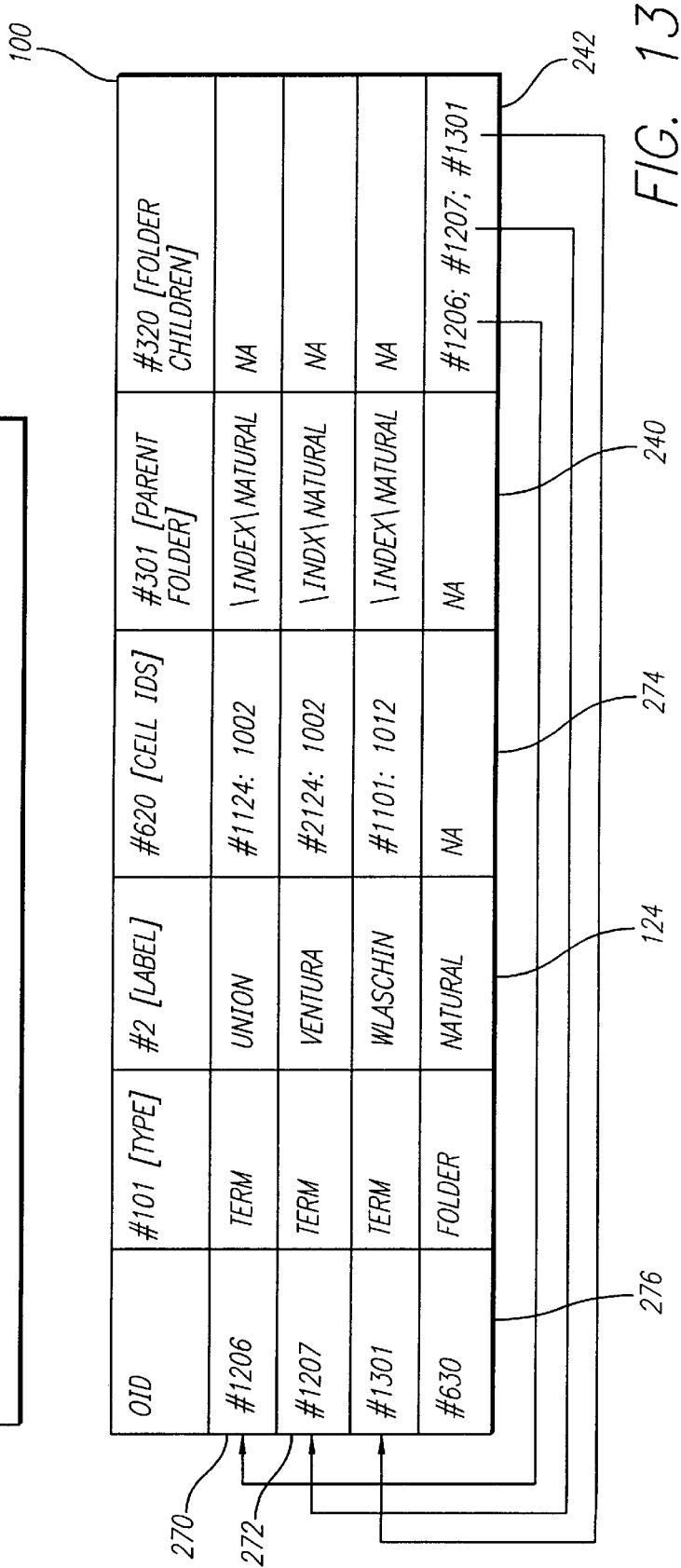
FIG. 13 illustrates key word index records stored in the table of FIG. 2.

The sorted list 250 as illustrated in FIG. 11 is stored as a Folder, as illustrated in FIG. 13. A cell identification field 274 maintains the cells that include the term corresponding to that record. The "Parent Folder" column 240 for each of the terms on the list 250 indicates that the parent folder is an index with a title "Natural." The "Natural" folder has a row 276 that has pointers in the "Folder Children" column 242 to all of the terms in the list 250.

The "Natural" folder corresponds to an index sorted by a specific type of algorithm. Computer programs generally sort using a standard collating sequence such as ASCII. The present invention provides an improvement over this type of sorting and the improved sorting technique corresponds to the "Natural" folder. Records in the "Natural" folder are sorted according to the following rules:

1) A key phrase may occur at more than one point in the list. In particular:
   1a) Key phrases may be permuted and stored under each permutation. For example: 'John Smith' can be stored under 'John' and also under 'Smith'. Noise words such as 'a' and 'the' are ignored in the permutation.
   1b) Key phrases which are numeric or date oriented may be stored under each possible location. For example: '1984' can be stored under the digit '1984' and also under 'One thousand, nine hundred . . .', and 'nineteen eighty four'.
2) Numbers are sorted naturally. For example, '20' comes after '3' and before '100'.
3) Prefixes in key phrases are ignored. For example, 'The Big Oak' is sorted under 'Big'.
4) Key phrases are stemmed, so that 'Computers' and 'Computing' map to the identical key phrase record.

The preferred embodiment of the routine for generating positions for entering the key phrases into the 'Natural' folder is as follows:

1) Capitalize the key phrase to avoid case sensitivity problems. For example: 'John Smith the 1st' becomes 'JOHN SMITH THE 1ST'.
2) Each word in the key phrases is stemmed using standard techniques. Eg "COMPUTERS" becomes "COMPUT".
3) Permute the key phrase. This results in a new set of multiple key phrases based on the original key phrase. For example 'JOHN SMITH THE 1ST' produces the set {'JOHN SMITH THE 1ST'; 'SMITH THE 1ST JOHN'; 'THE 1ST JOHN SMITH'; '1ST JOHN SMITH THE'}.
4) Noise prefixes are eliminated. In the example above, the third entry, 'THE 1ST JOHN SMITH', is eliminated. If no phrases are left after elimination, the original phrase is used. For example, an entry for 'TO BE OR NOT TO BE' would be preserved even if all noise words were eliminated.
5) For each result, numbers and dates are expanded to all possible text representations, and text representations are converted to numeric. For example: '1ST JOHN SMITH THE' generates the set: {'1ST JOHN SMITH THE'; 'FIRST JOHN SMITH THE'}
6) Finally, each modified key phrase is used to determine the position of a reference to the main key phrase record, and an entry is made in the folder accordingly. For example, '1ST JOHN SMITH THE' is stored between '1' and '2', while 'FIRST JOHN SMITH THE' is stored after 'FIR' and before 'FIS.'

FIG. 22a illustrates the results of a prior art sorting algorithm while FIG. 22b illustrates the results of a sorting algorithm according to the present invention.

Extracting the Key Phrases

To generate a sorted list, the system must first extract the key phrases or words from the applicable cells. Various combinations of key phrase extraction can be used.

In full text extraction, every word is indexed, which is typical for standard text retrieval systems. In column extraction, the whole contents of the column are indexed which corresponds to a standard database system. According to a third type of extraction, automatic analysis, the contents of the text are analyzed and key phrases are extracted based on matching phrases, semantic context, and other factors. Finally, in manual selection extraction, the user or application explicitly marks the key phrase for indexing.

When automatic analysis is used, the 'key phrase' anchors are automatically updated whenever the text in the cell changes. This is advantageous as it removes the necessity for manually linking cells when data changes.

The Use of Fields to Support Text Indexing

As each field has its own field definition, each field can define how it is text-indexed. For example, the 'Last name' field may be analyzed so that it's entire contents is considered important, and indexed, while the "Phone" field may be analyzed so that it's entire contents is considered unimportant, and never indexed.

The combination of structured information and text allows various combinations of key phrase extraction to be used differently for each individual cell in a record, allowing the user to select the most suitable combination. In particular, certain fields can be defined such that links based on key phrases are automatically created for data in those fields, without user intervention.

The Advantages of Storing Links in the Database

Publication of database material often requires the inclusion of links between data items. Traditionally, the links have been kept separate from the data, necessitating the relinking of the data items every time the material is prepared for publication. By storing the links with the data, and by automatically updating the links, the current invention eliminates the need for two steps. This is particularly advantageous when publishing in a format that supports links, but is hard to maintain, such as Hypertext Markup Language (HTML). Furthermore, the database system can be used as a single repository for generating many different kinds of data formats that involve links.

Date Indexing System

The date indexing scheme is very similar to the text indexing scheme as previously described. Important dates are extracted from the text and added to an 'Important Date' list. Each important date is represented by a 'Important Date' record. The 'Important Date' records are stored in a 'Important Dates' folder, which is sorted by date.

The important dates are extracted from the text. The system may search for numeric dates, such as '4/5/94' or date-oriented text, such as "Tomorrow", "next Tuesday" or "Christmas". FIG. 23 illustrates the correspondence between cells of the table of FIG. 2 and a sorted date index.

Important Date records are assigned special predetermined OIDS since they always have the same identity in any system. Assigning predetermined OID's to dates allows Important Dates to be shared across systems. The predetermined OID is generated by using a special session identification number that signifies that the OID is an Important Date. In this case, the timestamp represents the value of the Important Date itself, not the time that it was created.

Associative Queries

Figure 14:
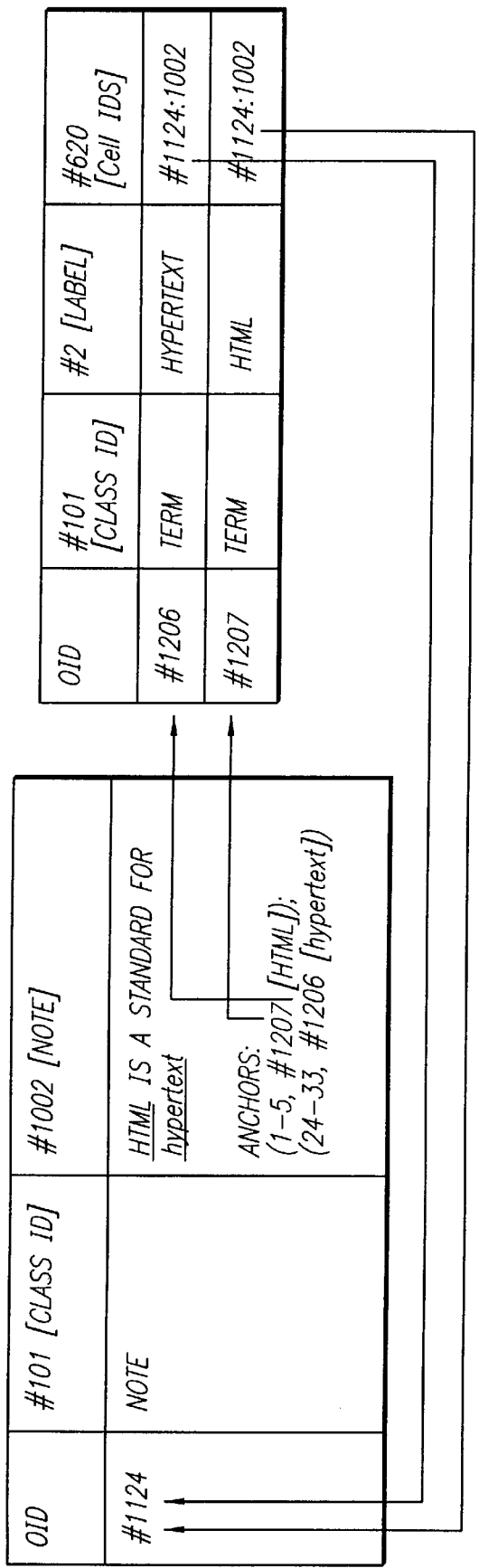
FIG. 14 illustrates the relationship between certain data records and key word index records.

As previously described, a sorted key word list is generated from the text in cells and list stored in a folder whose records point to the text cells. The associations between the list of records with text and the list of key phrases is two-way since the cells that include text point to the key words. FIG. 14 illustrates this two way correspondence. Each record can point to multiple key phrases, and each key phrase can point to multiple records.

Figure 15:
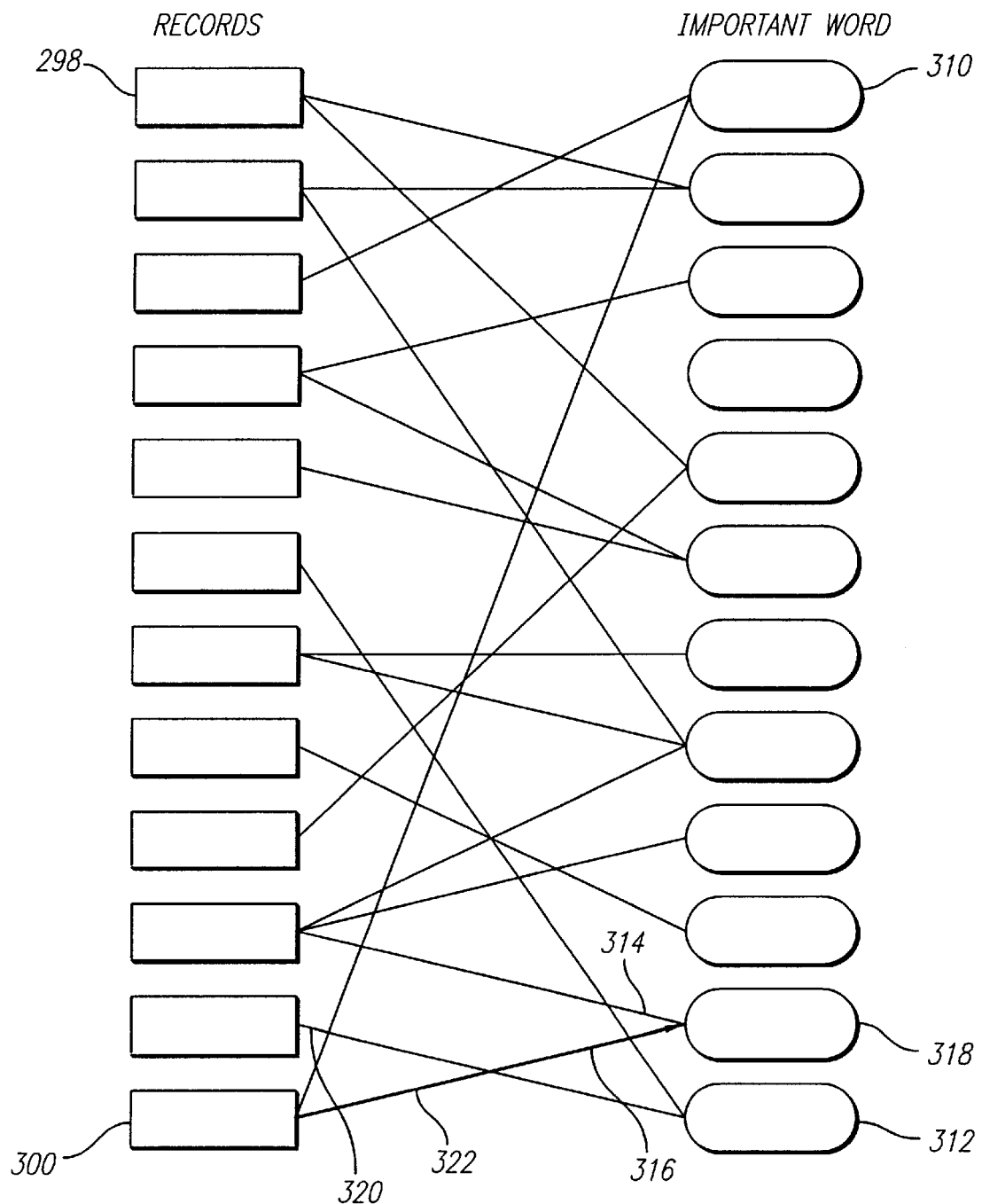
FIG. 15 illustrates the relationship of FIG. 14 in graphical form.

FIG. 15 is a graphical representation of the two way association between records and the key word list. Each record in a plurality of records 298 through 300 may point to one or more important word entries 310 through 312. Similarly, each important word entry may point to one or more records. A single level search involves starting at one node (on either side of the graph) and following the links to the other side. For example, a user may wish to find the records including the word "Shasta." First, the important word index would be accessed to find the word "Shasta" and the records pointed to by this word would then be retrieved. This search is indicated by the arrows 314 and 316 where word "Shasta" corresponds to cell 318. Similarly, a user may wish to locate all of the important words included in a particular record, indicated by the arrows 320 and 322 in FIG. 15.

The search can be extended by repeatedly following the links back and forth to the desired level. FIG. 16a illustrates this concept. As an example, the term "Shasta" may correspond to a dog with extraordinary intelligence such that in one record, "Shasta" is described as a dog and another record, 'Shasta' is described as a genius. If the user wishes to find the words associated with 'Shasta', the system locates "Shasta" in the "Important Words" folder which points to the records including the word "Shasta." In turn, the records pointed to contain pointers to the "Important Words" list for each indexed word in the record. Since "Shasta" appears with "dog" and "genius" in the records, these words are retrieved by the system.

Figure 16B:
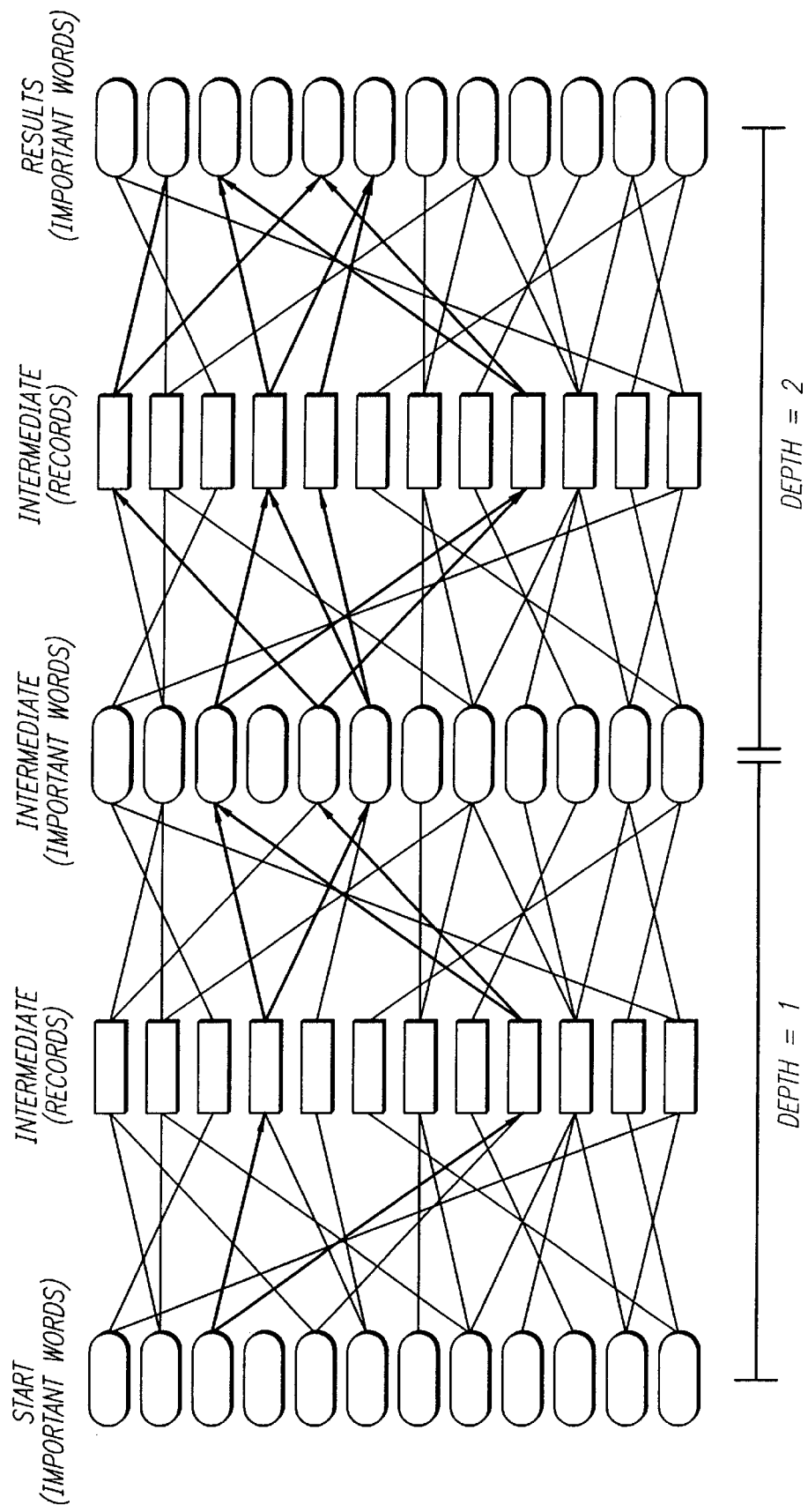
FIG. 16b illustrates a further extended search in graphical form.

This type of searching may be extended indefinitely. FIG. 16b illustrates an additional level of searching. Continuing with the above example, the word "genius" may occur in records referring to Dirac, and the word "dog" associated with "Checkers," such that the multilevel search illustrated in FIG. 16b results in a retrieval of "Dirac" and "Checkers" when provided with the word "Shasta."

A relevance ranking can be created based on weights associated with each link and type of key word, and the records can be displayed in order of descending relevance. In the preferred embodiment, if two or more nodes are used as the starting point, the relevance is based on the distance from all nodes. In this way, only nodes which are near all the initial nodes will have a high relevance. Many other relevance rankings apart from distance may be used.

To refine the search, filters can be used to constrain the links that are followed. For example, the search may be filtered such that only the type "Person" is listed such that, in the above example, Shasta will be associated with Dirac but not Checkers.

Knowledge Base and Thesaurus

The present invention includes a knowledge base and thesaurus to further improve searching capabilities.

Each important word record (term) included within the thesaurus contains a pointer to a 'concept' record. Each concept record contains pointers to other concept records, and to the terms that are included within the bounds of that concept. FIG. 17 illustrates the structure of the thesaurus. The table 100 includes a "Parent Concept" column 352, a "Concept Name" column 354, a "Synonyms" column 356, a "More Specific Terms" column 358, a "More General Terms" column 360 and a "See Also" column 362. A concept record 350 defines the concept "IBM" and the Synonyms column 356 points to records that are synonymous with IBM, a record 364 with a label field with the value "IBM" and a record 366 with a label field with the value "International Business Machines." The records 364 and 366 have pointers in the "parent concept" field that point to the parent concept record 350.

The thesaurus structure illustrated in FIG. 17 provides for greater flexibility than exact synonyms. The "More Specific Terms" column 358 of the concept record 350 associated with "IBM" points to a concept record 368 associated with the IBM PC with an assigned weight of 100%, where the weight percentage reflects the similarity between the initial term "IBM" and the related term "IBM PC." Similarly, the "More General Terms" column 360 of the concept record 350 associated with "IBM" points to a concept record 372 associated with Computer Companies with an assigned weight of 60%. The "See also" column points to a record associated with the concept "Microsoft" with a weight of 70%, where the weight percentage reflects the similarity between the initial term "IBM" and the related term "IBM PC."

The Thesaurus illustrated in FIG. 17 enhances the searching mechanisms previously described with reference to FIGS. 14–16b. The system first locates the record associated with a key word and locates the parent concept record pointed to by the key word record. The system may then follow some or all of the pointers in the columns 356, 358, 360 and 352 and return of the OID's stored in the 'Concept Name' column 354.

Since key phrases and concepts are stored as records in this system, any other columns may be used to extend the knowledge and information stored therein. In particular, through the use of OID's, the system can store any kind of relationship, including relationships other than thesaural relationships, between key phrases, concepts and other records.

Application Support

The database of the present invention has been described without reference to its interface with applications that may use the invention as their primary storage and retrieval system. As previously described with reference to FIG. 2, the present database includes an interface to support applications programs. Components in the application support system include external document support, hypertext, document management and workflow, calendaring and scheduling, security and other features.

Further, the present invention includes various user interface components that also have been developed to provide full access to the structure of the database of the present invention. In particular, a new kind of structured word processor will be presented. The Specification will describe each component of the application support system separately.

External Documents

The present invention supports indexing of external documents. The table 100 stores the filenames of documents, such as word processor documents, where the contents of the files are not directly stored in the database. The documents names may be stored in a column with a specialized "External Document" domain. The external documents may reside in the mass memory 32 or on a multi-source that interfaces with the system through device control 36.

To index documents external to the table 100, prior to processing, an external document is converted into a plain text format. Key phrases are then extracted as previously described. In particular, fields in the text can be determined and mapped to fields within the database. For example, a 'Memo' document may contain the text: 'To: John Smith. From: Mary Doe'. This text can be mapped to the fields called 'to' and 'from', and the values of these fields set accordingly. The analysis of the text in this way can be changed for different types of external documents such as memos, legal documents, spread sheets, computer source code and any other type of document. For each extracted key phrase, a start and stop point within the text is determined. A list of anchors of the format previously described, <start, stop, key phrase> is generated by the parser and stored within the table 100 under the external document domain.

Viewing External Documents

When a user views an external document on the display screen 37, the stored anchors are overlaid on top of the document such that it appears that the external document has been marked with hypertext. When the user clicks the switches 45 or 47 of the mouse 50 on a section of the external document display, the corresponding anchor is determined from the various start and stop coordinates. The OID of the key phrase corresponding to the anchor is stored within the anchor, and can be used for the purposes of retrieving the key phrase record or initiating a query as previously described.

Dynamic Hypertext

The present invention supports Hypertext. Hypertext systems typically associate a region of text with a pointer to another record, as illustrated in FIG. 18. This creates a 'hard-coded' link between the source and the target. When a user clicks on the source region, the target record is loaded and displayed. If the target record is absent, the hypertext jump will fail, possibly with serious consequences.

The present system uses a new approach based on a dynamic association between records. In the preferred embodiment, each hypertext region is associated with a key phrase, not a normal record. When the user clicks the switches 45 or 47 of the mouse 50 on the source region, all the records associated with the key phrase are retrieved and ranked using any of the associative search techniques previously described. As illustrated in FIG. 19, the application can then display on the display screen 37 either the highest ranked item, or present all the retrieved items and allow the user to pick the one to access.

In certain applications, the user may want to access a single 'default' item. This item can be determined automatically, by picking the item at the top of the dynamically generated list, or manually, by letting the user pick the item explicitly and then preserving this choice in the anchor itself.

Annotations

The database of the present invention includes the ability to annotate and comment on any record, either by adding 'annotation' fields to an existing record, or by creating a new 'annotation' record that points to the original record. Unlike annotation mechanisms in the prior art, this annotation mechanism is fully integrated into the database, and is available for indexing, to have hypertext, to be placed in folders, and so on.

This ability is particularly advantageous when combined with the storage system described in the copending application entitled "Method and Apparatus for a Physical Storage Architecture for a Shared File Environment," filed Feb. 3, 1995, Ser. No. 08/384,706, as it allows for the integrated annotation of read-only media such as CD-ROM.

The generic Word Processor

The database of the present invention includes a novel Structured Word Processor that may be used in conjunction with the table 100.

The structured word processor of the present invention uses the "boxes and glue" paradigm introduced by Donald Knuth in $T_EX$. According to this paradigm, a page of text is created by starting with individual characters and concatenating the characters to form larger units, called "boxes," and then combining these boxes into yet larger boxes. FIG. 20a illustrates three character boxes 400, 402 and 404 concatenated to form a word box 406. FIG. 20b illustrates four word boxes 410, 412, 414 and the word box 406 combined to form a horizontal line box 408. Horizontal boxes are used for words and other text tokens that are spaced horizontally inside another box, such as a line (or column width). FIG. 20c illustrates the combination of the horizontal line box 408 with another horizontal line box 424 to form a vertical box 420. Vertical boxes are used for paragraphs and other objects that are spaced vertically inside other boxes, such as page height.

Boxes may be attached to other boxes with "glue." The glue can stretch or shrink, as needed. For example, in a justified sentence, the white space between words is stretched to force the words to line up at the right edge of the column. Glue can be used for between-character (horizontal) spacing, between-word (horizontal) spacing including "tab" glue, that "sticks" to tab markings. Glue may also be used for between-line (vertical) spacing and between-paragraph (vertical) spacing.

Figure 21:
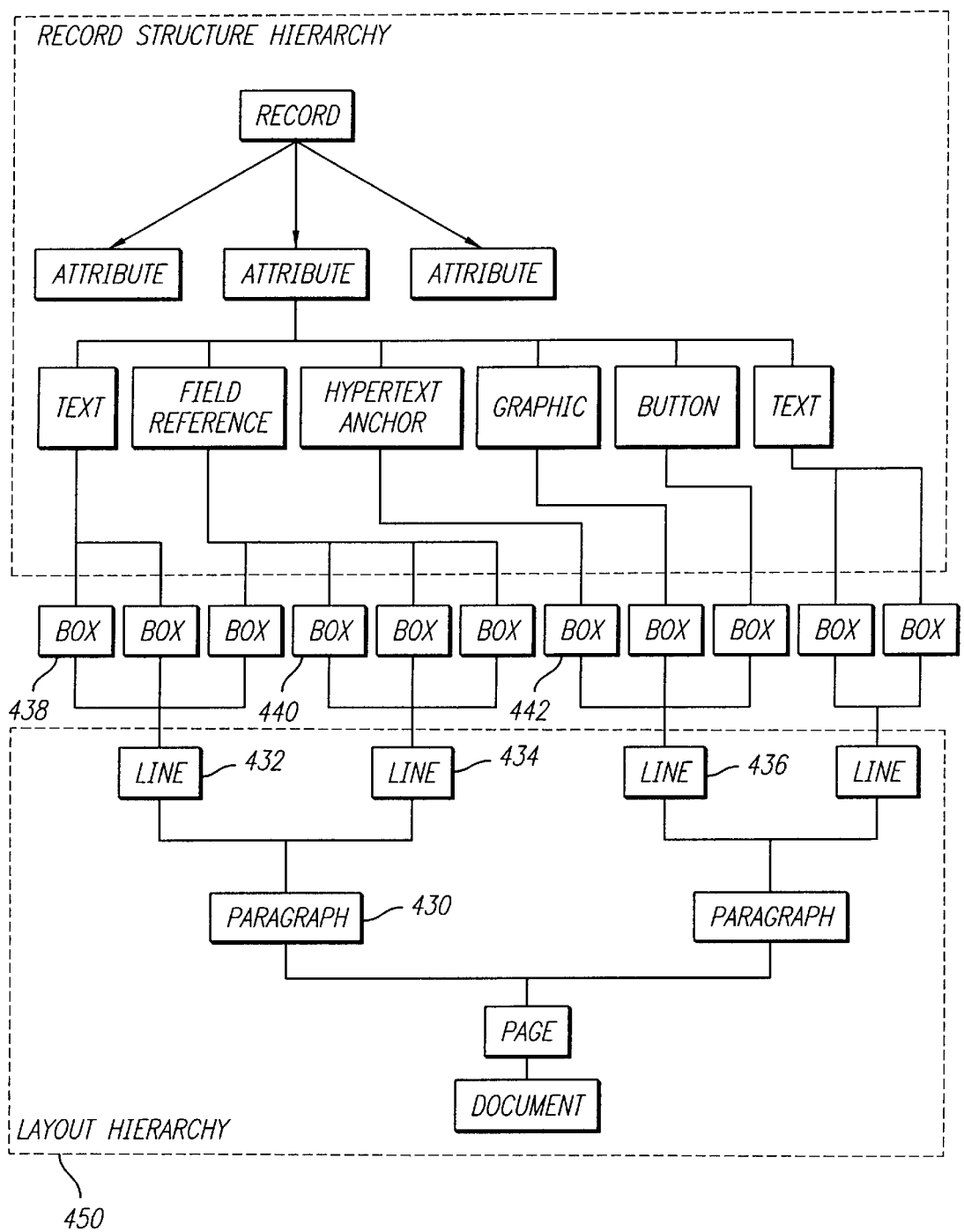
FIG. 21 illustrates the box tree structure of the word processor of the present invention.

When a record of the table 100 is edited, each word and field definition is converted into boxes. The system organizes these boxes into a tree structure of line boxes and paragraph boxes, as illustrated in FIG. 21. Shown there is a record hierarchy 460, corresponding to the hierarchy of a record, and a layout hierarchy 470, corresponding to the hierarchy of a layout such as a document generated according to the word processor described with reference to FIGS. 20a–20c. The record structure hierarchy 460 represents the record structure of the table 100 where a record 462 corresponds to a row in the table 100 and the record 462 includes a plurality of attributes, including attribute 464, that correspond to the columns of the table 100. In turn, the attributes may include a variety of items. For example, the attribute 464 includes text, represented by block 466, field references represented by block 468 and other items as shown.

The layout hierarchy 470 comprises a document 472 which in turn comprises a plurality of pages, including page 474. The page 474 comprises a plurality of paragraphs including paragraphs 430 and 431 and the paragraph 430 comprises a plurality of lines, including lines 432 and 434. The paragraph 431 includes line 436.

The word processor of the present invention allows the document 472 to be inserted into the record 462 by providing a plurality of boxes, including boxes 438, 440 and 442, common to both the record structure hierarchy 460 and the layout hierarchy 470. For example, the box 438 corresponds to part of the line 432 and comprises part of the text of attribute 464 as illustrated by block 466. Similarly, the box 440 corresponds to part of the line 434 and may comprise a field reference as indicated by block 468. Thus, the shared box structure as illustrated in FIG. 21 allows any type of word processing document to interface with any record in the table 100.

Conceptually, each box is kept as a bitmap, and its height and width are known, so the system displays the tree structure 450 by displaying all of the bitmaps corresponding to the boxes in the tree. If the tree is changed, for example, by adding a new word, only the new word box and a relatively small number of adjacent boxes need be recalculated. Similarly, line breaks or restructuring of a paragraph does not alter most of the word boxes, which may be reused, and only the lineboxes need be recalculated.

To edit the tree structure 450 as illustrated in FIG. 21, a user may click a cursor on a part of the text. The system locates the word box or glue that is being edited by a recursively descending through the tree structure 450.

The word processor supports multiple fonts and special effects such as subscripts, dropcaps and other features including graphic objects. A word in a different font than a base font is in a different box and may have a different height from other boxes on a line. The height of a linebox the height of the largest wordbox within it. Effects within a word can be handled by breaking a word into subboxes with no glue between them. Again, the height of a wordbox is the height of the largest box within it. Graphic objects, such as bitmaps, may be treated and formatted as a fixed width box.

The word processor of the present invention may be used to edit records in the table 100. The text associated with each field in a record can be considered a "paragraph" for the purposes of inter-field spacing, text flow within a field, and other formatting parameters. Storing all the fields in the same way during text-editing allows the movement of text and "flow" to appear natural.

As previously described, the text being edited is divided into fields, with each field corresponding to a column in the underlying database. Unlike a traditional static data entry form, the positions and sizes of the attributes are not fixed but are dynamic and all the features of a word-processor such as fonts and embedded graphics are available to edit the record fields.

Similarly, all of the features of a database such as lookups and mailmerge are available to the word processor. All of the attributes that apply to data entry for a particular field are enforced by the word processor. Such attributes might include a mask (such as ###-####), existence requirements, range and value constraints, etc. The fields can be explicitly labelled, or hidden and implied.

The word processor of the present invention allows existing fields to be added by typing the prefix of a field name and pressing a button. The system then completes the rest of the field name automatically.

The word processor of the present invention supports other database features. For example, new fields can be created by a user by using a popup dialog box. Similarly, references to other records or important words can be added by a dialog box. With particular regard to the table 100 of the present invention, OID references may support fields within other fields and a particular field within other fields supports the use of 'templates,' where a template is a list of field references embedded in text. For example, the template "Enter the first name here <fieldref id=firstName> and the last name here <fieldref id=lastName>" would appear to the user as "Enter the first name here: John and the last name here: Doe." Templates allow a user to build dynamic forms quickly and easily without having to use complicated form drawing tools.

Any set of fields or layout can be saved and reused as a named template. Such templates preserve all the formatting and layout of the fields, but contain no actual field data themselves. Instead they contain empty field references (as described above) which act as placeholders for data in the word-processor.

The user interface for the word processor of the present invention allows a user to switch between two modes of data entry. The word-processor of the present invention is used for flexible entry into one record at a time, while a columnar view is used for entering data in columns. The user can switch back and forth between these two views with no loss of data and switching from the word processor to the columnar view will cause the fields that were entered in the single item to become the columns to be displayed in the columnar view.

Finally, the 'fields within fields' that are apparent in the word processor view become separated into columns in a columnar view. The user can then make changes in columnar mode, and then, when switching back to the word processor view, the columns become combined once again.

Structured Email

A particular use of the present invention is to support the creation, automatic indexing, organization and retrieval of 'structured' email. Structured email is a variant of traditional email that stores fields and other structural information in the body of the message. As noted, the present invention supports the flexible data entry needed for email through the use of the word processor and templates, and brings to the management, indexing and retrieval of such email all the advantages described herein.

When used in conjunction with the distributed storage system described in the copending application entitled "Method and Apparatus for a Physical Storage Architecture for a Shared File Environment," filed Feb. 3, 1995, Ser. No. 08/384,706, and an email transport such as Simple Mail Transport Protocol (SMTP), the current invention provides an advantageous implementation of email.

Passwords

It is often required that access to particular data items be restricted to certain users. In order to apply these restrictions, an information management system must determine the identity of the user requesting access. This is currently done in two ways, physically measuring a unique quality of the uses of requesting information from the user, most current information management systems rely on the second approach, by using 'passwords'. However, to avoid security problems with a password system, three guidelines are applied to passwords:

a) the password should not be made of common words, because an aggressor can use a brute force approach and a dictionary to guess the password;

b) the password should be longer rather than shorter; and c) the password should be changed often, so that even if is stolen it will not be valid for long.

Finally, a password should never be written down or embedded into a login script and should always be interactive.

According to the present password system, a user's identity is determined through an extensive question and answer session. The responses to certain personal questions very quickly identify the user with high accuracy. Even an accurate mimic will eventually fail to answer correctly if the question and answer session is prolonged.

For example, sample questions might be: 'What is your favorite breakfast cereal?'; 'Where were you in April 1990?'

'What color is your toothbrush?'. These questions are wide ranging and hard to mimic. Furthermore, the correct responses are natural English sentences, with an extremely large solution space, so that a brute force approach is unlikely to be successful.

To improve the effectiveness of the response, an exact matching of user response and stored answer is not required and 'fuzzy' and 'associative' matching can be used according to the synonym, thesaurus and other features of the present invention.

According to the password system of the present invention, the user creates the list of questions and corresponding answers, which are then stored. Because the user has complete control over the questions, the user may find the process of creating the questions and answers enjoyable, and as a result, change the questions and answer list more frequently, further enhancing system security.

According to the preferred embodiment, a user creates a list of 50–100 questions and answers that are encrypted and stored. The questions can be entirely new, or can be based on a large database of interesting questions. When the user logs on the system, the system randomly selects one of the questions related to that user and presents the question to the user. The user then types in a response, which is matched against the correct answer. The matching can be fuzzy and associative, as described above. If the response matches correctly, access is allowed.

In an alternate embodiment, more security may be provided by repeatedly asking questions until a certain risk threshold is reached. For example, if the answer to 'What color is your toothbrush?' is the single word 'Red', then brute force guessing may be effective in this one case. In this scenario, repeatedly asking questions will diminish the probability of brute force success.

Summary

While the invention has been described in conjunction with the preferred embodiment, it is evident that numerous alternatives, modifications, variations and uses will be apparent to those skilled in the art in light of the foregoing description. Many other adaptations of the present invention are possible.

We claim:

1. A method for operating a computer system including a memory configured according to a logical table, a central processing unit and a display, said method including the steps of:
    configuring an extensible logical table to include:
        a plurality of rows, each said row including an object identification number (OID) to identify each said row, each said row corresponding to a record of information;
        a plurality of columns intersecting said plurality of rows to define a plurality of cells, a cell being basic unit of storage, each said column including an OID to identify each said column; and wherein
    at least one row includes a fields cell having references to a plurality of labeled columns.

2. The method of claim 1 wherein said fields cell further includes information related to each of said labeled columns.

3. The method of claim 1 further comprising the step of performing an operation on data within said labeled columns according to said at least one row.

4. The method of claim 3 wherein said operation comprises at least one of the following: an editing operation, a printing operation, a searching operation or an exporting operation.

5. The method of claim 1 wherein said at least one row comprises a template for a structured e-mail message.

6. A method for storing and retrieving data in a computer system including a memory, a central processing unit and a display, said method including the steps of:
    configuring said memory according to an extensible logical table, said extensible logical table including:
        a plurality of rows, each said row including an object identification number (OID) to identify each said row, each said row corresponding to a record of information;
        a plurality of columns intersecting said plurality of rows to define a plurality of cells, a cell being basic unit of storage, each said column including an OID to identify each said column, at least one cell in a particular row including a definition, said definition including a reference to at least one column;
        automatically adding to said one cell a reference to a first row according to said definition.

7. The method of claim 6 wherein said definition includes a reference to every row that includes a valid value in a certain column.

8. The method of claim 6 wherein said definition includes a query that results in references to a plurality of rows that satisfy the query.

9. The method of claim 5 wherein said particular row comprises a folder type row.

10. A method for storing and retrieving data in a computer system including a memory, a central processing unit and a display, said method including the steps of:
    configuring said memory according to an extensible logical table, said extensible logical table including:
        a plurality of rows, each said row including an object identification number (OID) to identify each said row, each said row corresponding to a record of information;
        a plurality of columns intersecting said plurality of rows to define a plurality of cells, a cell being basic unit of storage, each said column including an OID to identify each said column, at least one of said columns including information to indicate an indexing method corresponding to said column; and
        indexing said at least one column according to said indexing method.

11. The method of claim 10 wherein:
    at least one of said cells includes a pointer to an index record; and
    said indexing method includes the steps of:
        searching said table for at least two key words; and
        creating index records for at least two key words, said index records including one or more pointers to cells in said table that contain said key words.

12. The method of claim 11 further including the step of querying said table, said step querying said table further including the steps of:
    locating one of said index records according to the query of a user;
    retrieving at least one cell in said table pointed to by said located index record.

13. The method of claim 12 wherein said step of locating one of said index records further includes the steps of locating at least one of said index records pointed to by said at least one retrieved cell.

14. The method of claim 13 further including the step of weighting key words and retrieved cells according to predefined search criteria.

15. The method of claim 13 further including the step of filtering key words and retrieved cells according to predefined search criteria.

16. A method for storing and retrieving data in a computer system including a memory, a central processing unit and a display, said method including the steps of:
- configuring said memory according to an extensible logical table, said extensible logical table including:
  - a plurality of rows, each said row including an object identification number (OID) to identify each said row, each said row corresponding to a record of information;
  - a plurality of columns intersecting said plurality of rows to define a plurality of cells, a cell being the basic unit of storage, each said column including an OID to identify each said column, at least one cell in a particular row including an annotation such that said annotation cell is fully integrated into said logical table; and
  - performing an operation on said cell including said annotation.

17. The method of claim 16 wherein said operation comprises indexing.

18. The method of claim 16 wherein said annotation cell includes hypertext.

19. A method for storing and retrieving data in a computer system including a memory, a central processing unit and a display, said method including the steps of:
- configuring said memory according to a logical table, said logical table including:
  - a plurality of rows, each said row including an object identification number (OID) to identify each said row, each said row corresponding to a record of information;
  - a plurality of columns intersecting said plurality of rows to define a plurality of cells, each said column including an OID to identify each said column, at least one of said columns including information to indicate an indexing method corresponding to said column, at least one of said cells includes a pointer to an index record;
    - indexing said at least one column according to said indexing method, said indexing method includes the steps of;
      - searching said table for at least two key words;
- creating index records for at least two key words, said index records including one or more pointers to cells in said table that contain said key words;
- querying said table, said step querying said table further including the steps of:
  - locating one of said index records according to the query of a user;
  - retrieving at least one cell in said table pointed to by said located index record, said step of locating one of said index records further includes locating at least one of said index records pointed to by said at-least one retrieved cell; and
  - weighting key words and retrieved cells according to pre-defined search criteria.

20. A method for storing and retrieving data in a computer system including a memory, a central processing unit and a display, said method including the steps of:
- configuring said memory according to a logical table, said logical table including;
  - a plurality of rows, each said row including an object identification number (OID) to identify each said row, each said row corresponding to a record of information;
  - a plurality of columns intersecting said plurality of rows to define a plurality of cells, each said column including an OID to identify each said column, at least one of said columns including information to indicate an indexing method corresponding to said column, at least one of said cells includes a pointer to an index record;
    - indexing said at least one column according to said indexing method, said indexing method includes the steps of:
      - searching said table for at least two key words;
- creating index records for at least two key words, said index records including one or more pointers to cells in said table that contain said key words;
- querying said table, said step querying said table further including the steps of:
  - locating one of said index records according to the query of a user;
  - retrieving at least one cell in said table pointed to by said located index record, said step of locating one of said index records further includes locating at least one of said index records pointed to by said at least one retrieved cell; and filtering key words and retrieved cells according to pre-defined search criteria.

21. A method for storing and retrieving data in a computer system including a memory, a central processing unit and a display, said method including the steps of:
- configuring said memory according to a logical table, said logical table including;
  - a plurality of rows, each said row including an object identification number (OID) to identify each said row, each said row corresponding to a record of information;
  - a plurality of columns intersecting said plurality of rows to define a plurality of cells, each said column including an OID to identify each said column, at least one cell in a particular row including an annotation such that said annotation cell is fully integrated into said logical table; and
  - performing an operation on said cell including said annotation wherein said annotation cell includes hypertext.

22. A method for storing and retrieving data in a computer system memory comprising the steps of:
- configuring said memory according to an extensible logical table having a plurality of intersecting rows and columns defining a plurality of cells, at least one of said cells includes a pointer to an index record;
- indexing at least one column by;
  - creating index records for said at least two key words, said index records including one or more pointers to cells in said extensible logical table that contain said at least two key words;
  - locating one of said index records according to the query of a user;
  - retrieving at least one cell in said extensible logical table pointed to by said located index record;
  - locating at least one of said index records pointed to by said at least one retrieved cell; and
  - weighting key words and retrieved cells according to pre-defined search criteria.

23. A method for storing and retrieving data in a computer system memory comprising the steps of:
- configuring said memory according to an extensible logical table having a plurality of intersecting rows and columns defining a plurality of cells;
- creating index records for at least two key words, said index records including one or more pointers to cells in said extensible logical table that contain said key words, at least one of said cells includes a pointer to an index record;

indexing at least one column according to an indexing method;

locating one of said index records according to the query of a user;

retrieving at least one cell in said table pointed to by said located index record;

locating at least one of said index records pointed to by said at least one retrieved cell; and filtering key words and retrieved cells according to pre-defined search criteria.

24. A method for storing and retrieving data in a computer system memory comprising the steps of:

configuring said memory according to an extensible logical table having a plurality of intersecting rows and columns defining a plurality of cells, at least one of said columns including information to indicate an indexing method corresponding to said column, at least one cell includes an annotation such that said annotation cell is fully integrated into said extensible logical table; and performing an operation on said cell including said annotation wherein said annotation cell includes hypertext.

25. In a method for storing and retrieving information in a computer memory by configuring said memory according to a logical table having a plurality of rows, each said row corresponding to a record of information, and a plurality of columns intersecting said plurality of rows to define a plurality of cells, the improvement comprising:

including references to a plurality of labeled columns in a fields cell in at least one row.

26. The method of claim 25 wherein said fields cell further comprises information related to each of said columns.

27. The method of claim 25 further comprising the step of performing an operation on data within said columns according to said at least one row.

28. The method of claim 27 wherein said operation comprises at least one of the following: an editing operation, a printing operation, a searching operation or an exporting operation.

29. The method of claim 25 wherein said at least one row comprises a template for a structured e-mail message.

30. In a method for storing and retrieving information in a computer memory by configuring said memory according to a logical table having a plurality of rows, each said row corresponding to a record of information, and a plurality of columns intersecting said plurality of rows to define a plurality of cells, the improvement comprising:

including a definition in at least one cell in a first row, said definition including a reference to at least one column;

automatically adding to said one cell a reference to a second row according to said definition.

31. The method of claim 30 wherein said definition includes a reference to every row that includes a valid value in a first column.

32. The method of claim 30 wherein said definition includes a query that results in references to a plurality of rows that satisfy the query.

33. The method of claim 30 wherein said first row comprises a folder type row.

34. In a method for storing and retrieving information in a computer memory by configuring said memory according to a logical table having a plurality of rows, each said row corresponding to a record of information, and a plurality of columns intersecting said plurality of rows to define a plurality of cells, the improvement comprising:

including information in at least one of said columns to indicate an indexing method corresponding to said column; and indexing said at least one column according to said indexing method.

35. The method of claim 34 wherein:

at least one of said cells includes a pointer to an index record; and said indexing method includes the steps of:

searching said table for at least two key words; and creating index records for at least two key words, said index records including one or more pointers to cells in said table that contain said key words.

36. The method of claim 35 further including the step of querying said table, said step querying said table further including the steps of:

locating one of said index records according to the query of a user;

retrieving at least one cell in said table pointed to by said located index record.

37. The method of claim 36 wherein said step of locating one of said index records further includes the steps of locating at least one of said index records pointed to by said at least one retrieved cell.

38. The method of claim 37 further including the step of weighting key words and retrieved cells according to pre-defined search criteria.

39. The method of claim 37 further including the step of filtering key words and retrieved cells according to pre-defined search criteria.

40. In a method for storing and retrieving information in a computer memory by configuring said memory according to a logical table having a plurality of rows, each said row corresponding to a record of information, and a plurality of columns intersecting said plurality of rows to define a plurality of cells, the improvement comprising:

including an annotation in at least one cell in a first row, said annotation cell being fully integrated into said logical table; and performing an operation on said at least one cell including said annotation.

41. The method of claim 40 wherein said operation comprises indexing.

42. The method of claim 40 wherein said annotation cell includes hypertext.

43. A device for storing and retrieving data in a computer system memory comprising:

an extensible logical table having a plurality of intersecting rows and columns defining a plurality of cells;

at least one row includes a fields cell having references to a plurality of labeled columns an index record for at least two key words, said index record including one or more pointers to cells in said extensible logical table that contain said at least two key words;

means for locating one of said index records according to the query of a user;

means for retrieving at least one cell in said extensible logical table pointed to by said located index record;

means for locating at least one of said index records pointed to by said at least one retrieved cell; and means for weighting key words and retrieved cells according to pre-defined search criteria.

44. A device for storing and retrieving data in a computer system memory comprising:

an extensible logical table having a plurality of intersecting rows and columns defining a plurality of cells;

at least one row includes a fields cell having references to a plurality of labeled columns an index record for at least two key words, said index record including one or more pointers to cells in said extensible logical table that contain said at least two key words;

means for locating one of said index records according to the query of a user;

means for retrieving at least one cell in said extensible logical table pointed to by said located index record;

means for locating at least one of said index records pointed to by said at least one retrieved cell; and means for filtering key words and retrieved cells according to pre-defined search criteria.

45. A device for storing and retrieving data in a computer system memory comprising:

an extensible logical table having a plurality of intersecting rows and columns defining a plurality of cells;

at least one row includes a fields cell having references to a plurality of labeled columns at least one cell includes an annotation such that said annotation cell is fully integrated into said extensible logical table; and performing an operation on said cell including said annotation wherein said annotation cell includes hypertext.

46. A method for operating a computer system memory comprising the steps of:

configuring an extensible logical table to include:
  a plurality of rows, each row corresponding to a record of information;
  a plurality of columns intersecting said plurality of rows to define a plurality of cells; and
  at least one row includes a fields cell having references to a plurality of columns.

47. The method of claim 46 wherein said fields cell further includes information related to each of said referenced columns.

48. The method of claim 46 further comprising the step of:
performing an operation on data within said referenced columns according to said at least one row.

49. The method of claim 48 wherein said operation comprises at least one of the following: an editing operation, a printing operation, a searching operation or an exporting operation.

50. The method of claim 46 wherein said at least one row comprises a template for a structured e-mail message.

51. A method for storing and retrieving data in a computer system memory comprising the steps of:

configuring an extensible logical table in a computer system memory to include:
  a plurality of rows, each row corresponding to a record of information;
  a plurality of columns intersecting said plurality of rows to define a plurality of cells;
  at least one cell in a first row including a definition, said definition including a reference to at least one column; and automatically adding to said at least one cell a reference to a second row according to said definition.

52. The method of claim 51 wherein said definition includes a reference to every row that includes a valid value in a first column.

53. The method of claim 51 wherein said definition includes a query that results in references to a plurality of rows that satisfy the query.

54. The method of claim 51 wherein said first row comprises a folder type row.

55. A method for storing and retrieving data in a computer system memory comprising the steps of:

configuring an extensible logical table in a computer system memory to include:
  a plurality of rows, each row corresponding to a record of information;
  a plurality of columns intersecting said plurality of rows to define a plurality of cells; and
  at least one of said columns including information to indicate an indexing method corresponding to said column; and indexing said at least one column according to said indexing method.

56. The method of claim 55 wherein:
at least one of said cells includes a pointer to an index record; and
said indexing method comprises the steps of:
  searching said extensible table for at least two key words; and
  creating index records for at least two key words, said index records including one or more pointers to cells in said extensible table that contain said key words.

57. The method of claim 56 further comprising the steps of:
locating one of said index records according to the query of a user;
retrieving at least one cell in said table pointed to by said located index record.

58. The method of claim 57 wherein said step of locating one of said index records further comprises the step of locating at least one of said index records pointed to by said at least one retrieved cell.

59. The method of claim 58 further comprising the step of weighting key words and retrieved cells according to pre-defined search criteria.

60. The method of claim 58 further comprising the step of filtering key words and retrieved cells according to pre-defined search criteria.

61. A method for storing and retrieving data in a computer system memory comprising the steps of:

configuring an extensible logical table in a computer system memory to include:
  a plurality of rows, each row corresponding to a record of information;
  a plurality of columns intersecting said plurality of rows to define a plurality of cells; and
  at least one cell in a first row including an annotation such that said annotation cell is fully integrated into said extensible logical table; and performing an operation on said cell including said annotation.

62. The method of claim 61 wherein said operation comprises indexing.

63. The method of claim 61 wherein said annotation cell includes hypertext.

64. A data storage and retrieval system for a computer having a memory, a central processing unit and a display, comprising:

means for configuring said memory according to an extensible logical table, said extensible logical table including:
  a plurality of cells, each said cell having a first address segment and a second address segment;
  a plurality of attribute sets, each said attribute set including a series of cells having the same second address segment, each said attribute set including an object identification number (OID) to identify each said attribute set; and
  a plurality of records, each said record including a series of cells having the same first address segment, each said record including an OID to identify each said record, wherein at least one of said records has an OID equal to the OID of a corresponding one of said attribute sets, and at least one of said records includes a fields cell having references to a plurality of attribute sets.

65. The system of claim 64 wherein said fields cell further comprises information related to each of said referenced attribute sets.

66. The system of claim 64 further comprising:
    means for performing an operation on data within said referenced attribute sets according to said at least one record.

67. The system of claim 66 wherein said operation comprises at least one of the following: an editing operation, a printing operation, a searching operation or an exporting operation.

68. The system of claim 64 wherein said at least one record comprises a template for a structured e-mail message.

69. A data storage and retrieval system for a computer having a memory, a central processing unit and a display, comprising:
    means for configuring said memory according to an extensible logical table, said extensible logical table including:
        a plurality of cells, each said cell having a first address segment and a second address segment;
        a plurality of attribute sets, each said attribute set including a series of cells having the same second address segment, each said attribute set including an object identification number (OID) to identify each said attribute set;
        a plurality of records, each said record including a series of cells having the same first address segment, each said record including an OID to identify each said record, wherein at least one of said records has an OID equal to the OID of a corresponding one of said attribute sets;
        at least one cell in a first record including a definition, said definition including a reference to at least one attribute set; and
    means for automatically adding to said at least one cell a reference to a second record according to said definition.

70. The system of claim 69 wherein said definition comprises a reference to every record that includes a valid value in a first attribute set.

71. The system of claim 69 wherein said definition comprises a query that results in references to a plurality of rows that satisfy the query.

72. The method of claim 69 wherein said first record comprises a folder type record.

73. A data storage and retrieval system for a computer having a memory, a central processing unit and a display, comprising:
    means for configuring said memory according to an extensible logical table, said extensible logical table including:
        a plurality of cells, each said cell having a first address segment and a second address segment;
        a plurality of attribute sets, each said attribute set including a series of cells having the same second address segment, each said attribute set including an object identification number (OID) to identify each said attribute set, at least one of said attribute sets including information to indicate an indexing method corresponding to said attribute set;
        a plurality of records, each said record including a series of cells having the same first address segment, each said record including an OID to identify each said record, wherein at least one of said records has an OID equal to the OID of a corresponding one of said attribute sets; and
    means for indexing said at least one attribute set according to said indexing method.

74. The system of claim 73 wherein:
    at least one of said cells includes a pointer to an index record; and
    said means for indexing further comprises:
        means for searching said extensible table for at least two key words; and
        means for creating index records for at least two key words, said index records including one or more pointers to cells in said extensible table that contain said key words.

75. The system of claim 74 further comprising:
    means for locating one of said index records according to the query of a user;
    means for retrieving at least one cell in said extensible table pointed to by said located index record.

76. The system of claim 75 wherein said means for locating one of said index records further comprises means for locating at least one of said index records pointed to by said at least one retrieved cell.

77. The system of claim 76 further comprising means for weighting key words and retrieved cells according to predefined search criteria.

78. The system of claim 77 further comprising the step of filtering key words and retrieved cells according to predefined search criteria.

79. A data storage and retrieval system for a computer having a memory, a central processing unit and a display, comprising:
    means for configuring said memory according to an extensible logical table, said extensible logical table including:
        a plurality of cells, each said cell having a first address segment and a second address segment;
        a plurality of attribute sets, each said attribute set including a series of cells having the same second address segment, each said attribute set including an object identification number (OID) to identify each said attribute set;
        a plurality of records, each said record including a series of cells having the same first address segment, each said record including an OID to identify each said record, wherein at least one of said records has an OID equal to the OID of a corresponding one of said attribute sets, at least one cell in a first record including an annotation such that said annotation cell is fully integrated into said extensible logical table; and
    means for performing an operation on said cell including said annotation.

80. The system of claim 79 wherein said operation comprises indexing.

81. The system of claim 79 wherein said annotation cell includes hypertext.

* * * * *